United States Patent
Harari et al.

(10) Patent No.: US 10,757,025 B2
(45) Date of Patent: Aug. 25, 2020

(54) SMART LOAD BALANCER AND THROTTLE

(71) Applicant: RADCOM LTD., Tel Aviv (IL)

(72) Inventors: Eyal David Harari, Kiryat Ono (IL); Tomer Tuvia Ilan, Rosh Haayin (IL); Tiran Golan, Tel Aviv (IL)

(73) Assignee: Radcom Ltd., Tel Aviv (IL)

( * ) Notice: Subject to any disclaimer, the term of this patent is extended or adjusted under 35 U.S.C. 154(b) by 4 days.

(21) Appl. No.: 16/102,842

(22) Filed: Aug. 14, 2018

(65) Prior Publication Data

US 2018/0359186 A1    Dec. 13, 2018

Related U.S. Application Data

(63) Continuation-in-part of application No. 15/325,462, filed as application No. PCT/IB2016/054332 on Jul. 21, 2016, now Pat. No. 10,050,886.

(Continued)

(51) Int. Cl.
*H04W 28/08* (2009.01)
*H04L 12/803* (2013.01)
(Continued)

(52) U.S. Cl.
CPC ............ *H04L 47/125* (2013.01); *H04L 43/04* (2013.01); *H04L 43/12* (2013.01);
(Continued)

(58) Field of Classification Search
None
See application file for complete search history.

(56) References Cited

U.S. PATENT DOCUMENTS 5,598,535 A    1/1997 Brech et al.
2003/0198189 A1  10/2003 Roberts et al.
(Continued)

OTHER PUBLICATIONS

International Search Report dated Nov. 27, 2016 for corresponding PCT Application PCT/IB2016/054332 filed Jul. 21, 2016.
(Continued)

*Primary Examiner* — Mansour Oveissi
(74) *Attorney, Agent, or Firm* — A.C. Entis-IP Ltd.; Allan C. Entis

(57) ABSTRACT

A load balancing system for a packet switched communications network, the load balancing system comprising: at least one stateful load balancer configured to receive and process copies of control plane packets propagated by the network to determine a characterizing vector for each target feature of at least one target feature that characterizes packets propagated by the network, which vector comprises one or more characterizing components and is useable to associate packets propagated by the network with the target feature; and at least one non-stateful load balancer configured to: receive the at least one characterizing vector and copies of packets propagated by the network; use the at least one characterizing vector to associate a target feature of the at least one target feature with each of a plurality of the received packets; and load balance and transmit copies of packets that the non-stateful load balancer associates with a target feature of the at least one target feature to at least one probe, and copies of packets associated with a same target feature to a same probe of the at least one probe.

21 Claims, 12 Drawing Sheets

Related U.S. Application Data

(60) Provisional application No. 62/334,170, filed on May 10, 2016.

(51) Int. Cl.
  *H04L 12/823* (2013.01)
  *H04L 12/26* (2006.01)
  *H04L 12/851* (2013.01)
  *H04L 12/825* (2013.01)
  *H04L 12/24* (2006.01)

(52) U.S. Cl.
  CPC .......... *H04L 47/2483* (2013.01); *H04L 47/32* (2013.01); *H04L 41/0896* (2013.01); *H04L 43/028* (2013.01); *H04L 43/16* (2013.01); *H04L 47/25* (2013.01)

(56) References Cited

U.S. PATENT DOCUMENTS

| | | | |
|---|---|---|---|
| 2003/0223413 A1* | 12/2003 | Guerrero | H04L 45/245 370/389 |
| 2004/0131059 A1* | 7/2004 | Ayyakad | H04L 45/60 370/389 |
| 2011/0225372 A1 | 9/2011 | Pirog | |
| 2015/0117408 A1 | 4/2015 | Kedalagudde et al. | |
| 2017/0013049 A1 | 1/2017 | Patil | |
| 2017/0187771 A1 | 6/2017 | Falcon | |

OTHER PUBLICATIONS

U.S. Office Action dated Apr. 4, 2018 for U.S. Appl. No. 15/325,462, filed Nov. 1, 2017.

* cited by examiner

SMART LOAD BALANCER AND THROTTLE

RELATED APPLICATIONS

The present application is a continuation in part of U.S. patent application Ser. No. 15/325,462 filed on Jan. 11, 2017, now U.S. Pat. No. 10,050,886 issued on Aug. 14, 2018, which is a U.S. National Phase of PCT Application PCT/IB2016/054332, filed on Jul. 21, 2016, which claims the benefit under 35 U.S.C. 119 (e) of U.S. Provisional Application 62/334,170 filed on May 10, 2016, the disclosures of which are incorporated herein by reference.

FIELD

Embodiments of the disclosure relate to load balancing tasks comprised in monitoring a communication network

BACKGROUND

Modern communication networks support large, varied, and growing populations of users and an ever increasing gamut of user services and user applications for users who access the networks using any of various stationary and/or mobile user equipment (UE). The networks span not only global populations and geography, but a plethora of methods, devices, infrastructures, and protocols for propagating data, voice, and video content provided by a host of different large and small service providers.

As the various software and hardware resources that support the networks, configure paths along which network packets propagate in the networks, and provide services mediated by the networks have become more sophisticated, the resources, which may be referred to as network equipment (NE), have become fungible and logically abstracted away from their particular physical structures. The physical devices and apparatus underlying modern communication networks have become commodity resources that are configurable by software to provide virtualizations of network functions, referred to as "Network Functions Virtualization" (NFV), and "Software Defined Networks" (SDNs). And dedicated physical devices that provide particular network functionalities have been or are being replaced by software entities that access the physical commodities of a network, and/or other software entities of the network, on an "as need" basis to communicate with each other and provide functionalities required by the networks. The zoology of software entities are conventionally referred to as virtual entities, with a particular virtual entity typically distinguished by a name of a functionality it provides.

The extensive, complex infrastructure of many modern communication networks typically comprise a mix of dedicated physical devices and an ever increasing, if not dominant number, of virtual network entities engaged in an incessant packet exchange chatter approaching hundreds of gigabits per second (Gbps). Monitoring and troubleshooting the networks as much as possible in real time to maintain performance that provides acceptable quality of service (QoS) and user quality of experience (QoE) for the multitude of services that the networks provide has become a demanding challenge.

SUMMARY

An aspect of an embodiment of the disclosure relates to providing an optionally virtualized load balancing system that is relatively easily scalable and configured to efficiently distribute data propagating in a packet switched communication network to probes and/or other network monitoring entities, such as network security devices, network analyzers, and other network monitoring tools, generically referred to as probes, that operate to process the data and provide the network with information relevant to understanding, monetizing, and/or controlling, optionally, network performance. In an embodiment, the virtualized load balancing system, which may be referred to as a "Smart-vLB system" or simply a "Smart-vLB", comprises a hierarchical architecture comprising at least one "non-stateful" virtual load balancer (NS-vLB) and at least one stateful virtual load balancer (S-vLB). The at least one NS-vLB and at least one S-vLB cooperate to distribute data in packets that the Smart-vLB receives from the network for processing, to a plurality of probes, optionally comprising virtual probes (vProbes). In an embodiment, the communication network comprises an evolved packet system (EPS) network, which as discussed below may also be referred to as an LTE (long term evolution) network.

The at least one NS-vLB in the Smart-vLB receives packets, which may be control plane and/or user plane packets, that may be mirrored from at least one port in the network and distinguishes between packets, optionally referred to as "contextual packets", that it receives, and packets, optionally referred to as "non-contextual packets", which it receives. A contextual packet is a packet comprising data that may not be processed for a given desired purpose without reference to data from another, associated contextual packet and may advantageously be processed by a same virtual probe that processes data from the associated contextual packet. For example, a contextual packet may comprise data that may not be directly associated with a session or transaction to which it belongs but may be associated with another, associated, packet to determine a session or transaction to which the contextual packet belongs. Packets may be deemed associated by sharing a common attribute, such as by way of example, sharing a same network protocol or application, and/or belonging to a same network session or transaction. A non-contextual packet, is a packet comprising data that may be processed for a given desired purpose without reference to data from another packet and may for the given desired purpose be processed by a probe that is different from a probe that processes other packets for the same desired purpose. A non-contextual packet may by way of example be a packet that may be directly associated with a session or transaction to which it belongs without reference to data in another packet.

In an embodiment, each of the at least one NS-vLB is configured to transmit non-contextual packets that it receives for processing to a given physical or virtual probe of optionally a plurality of physical or virtual probes without reference to information in another packet. The NS-vLB is configured to transmit associated contextual packets characterized by a same shared attribute to a same S-vLB. The S-vLB transmits contextual packets for processing to a vProbe having an identity which the S-vLB determines based on information from at least one of a plurality of other packets that it receives. The S-vLB transmits a contextual packet that it receives for processing to a vProbe having an identity which the S-vLB determines based on information from at least one other packet that the S-v-LB receives.

In an embodiment the Smart-vLB is configured to load balance packets and control, "throttle", transmission rates of copies of packets to a probe for processing to prevent oversubscribing probe capacity. Optionally, load balancing and throttling transmission rates comprise associating the packets with a particular feature, also referred to as a target feature, that characterizes the packets and load balancing and throttling based on the particular feature. In an embodiment the target feature of the packets may by way of example, be an IMSI or an IMEI (International Mobile Equipment Identity) of a UE associated with transmission of the packets, an MSISDN (Mobile Station International Subscriber Directory Number), APN (Access Point Name), QCI, (Quality of Service Class Identifier), and/or a CGI (Cell Global Identifier).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the following detailed description, a Smart-vLB that is configured in accordance with an embodiment of the disclosure to load balance processing of control data transmitted in packets by entities comprised in an LTE communications network is described with reference to FIGS. 1-7B. Features and functioning of the LTE network are discussed with reference to FIG. 1. FIG. 2 schematically shows the Smart-vLB operating to load balance processing of data in control packets transmitted to and/or from an MME comprised in the LTE network shown in FIG. 1. Whereas the Smart-vLB in FIG. 2 is shown by way of example comprising two NS-vLBs and two S-vLBs, practice of an embodiment of the disclosure is not limited to Smart-vLBs comprising two each of NS-vLBs and S-vLBs. A Smart-vLB in accordance with an embodiment of the disclosure may comprise more or less than two NS-vLBs and more or less than two S-vLBs. Procedures by which component NS-vLBs and S-vLBs in the Smart-vLB process packets that the Smart-vLB receives from the LTE network are discussed with reference to the flow diagrams shown in FIGS. 3A-5C, 7A-7B, and 8.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1:
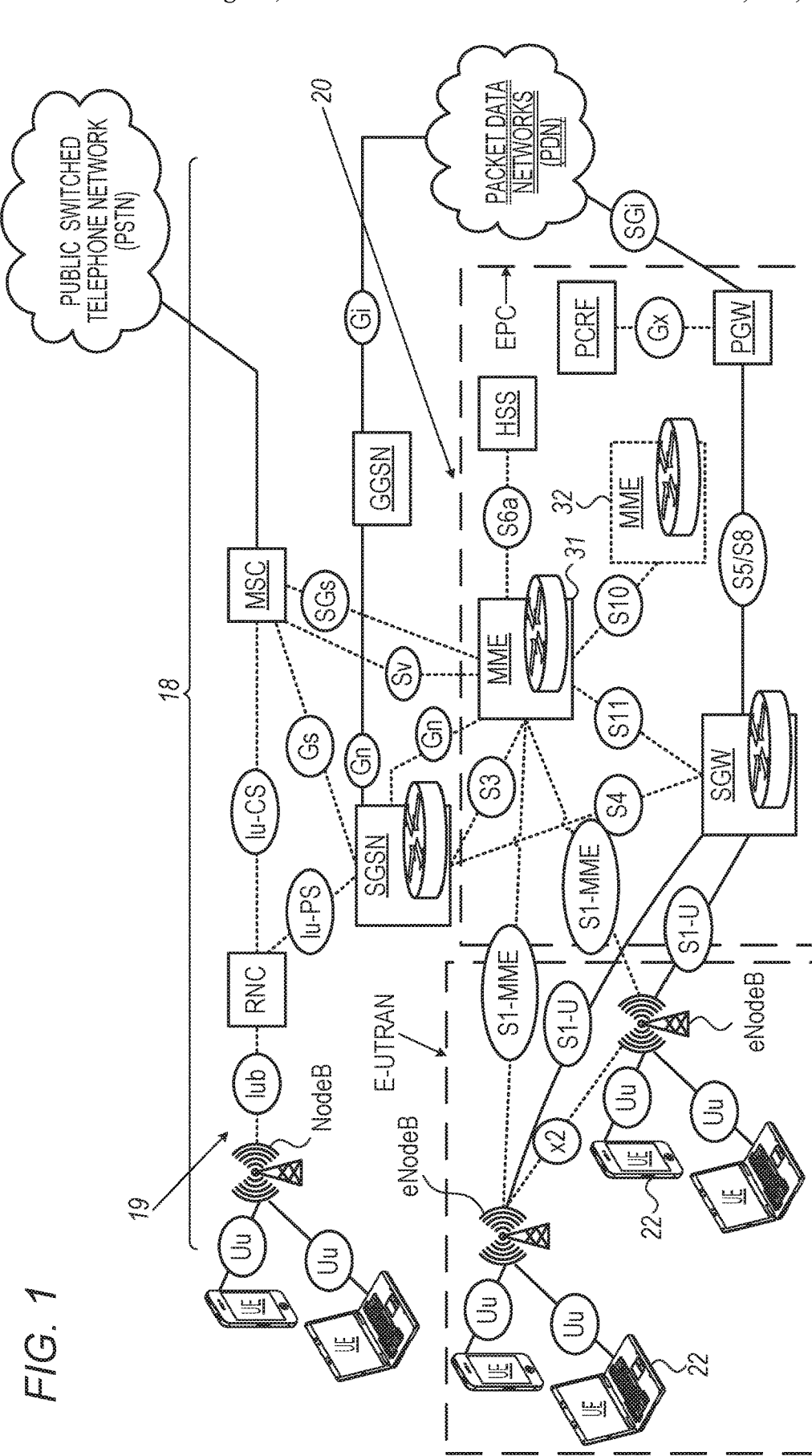
FIG. 1 schematically shows a long term evolution, LTE, communications network.
Figure 2:
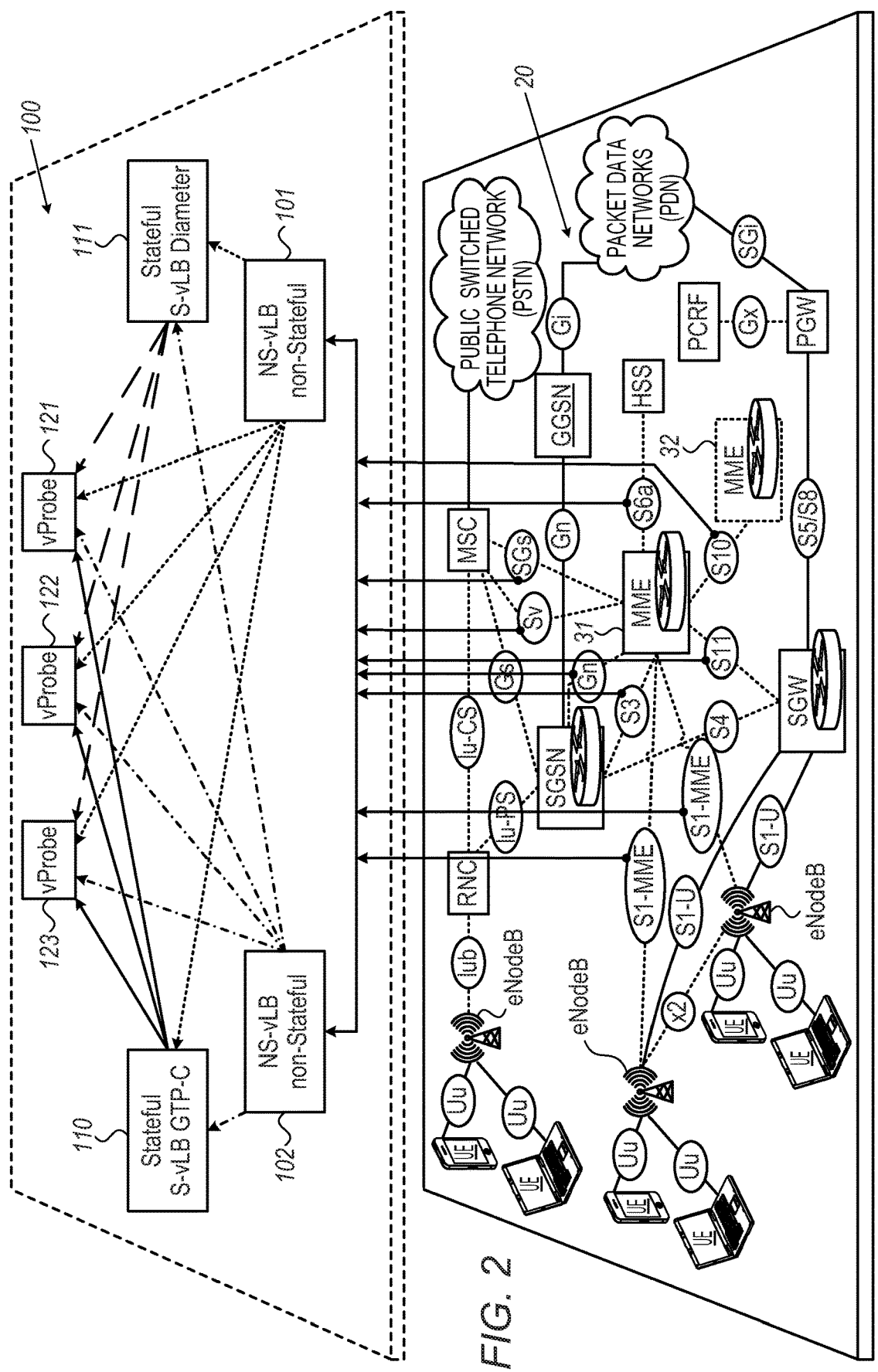
FIG. 2 schematically shows a Smart-vLB comprising NS-vLBs and S-vLBs operating to load balance processing of data comprised in control packets transmitted by network entities of the LTE shown in FIG. 1, in accordance with an embodiment of the disclosure.

FIG. 1 schematically shows network elements comprised in a mobile communication network 18 comprising a 3rd Generation Wireless Mobile Communication (3G) network 19 and an evolved packet system (EPS) communications network 20 that operates to connect a user's mobile communication equipment, (UE) to one or more Packet Data Networks (PDNs), and/or, as a circuit switch fallback option, to the Public Switched Telephone Network (PSTN). Network 20 may operate to provide a user's UE with communications to the Internet and/or to stationary and/or mobile communication equipment of other users (not shown). In FIG. 1 mobile user equipment, UE, is schematically represented by smartphone and laptop icons 22.

EPS network 20 comprises a packet switched core network referred to as an Evolved Packet Core (EPC) core network indicated by a dashed boundary labeled EPC and a Long Term Evolution (LTE) radio access network referred to as an Evolved Universal Terrestrial Radio Access Network E-UTRAN indicated by a dashed boundary labeled E-UTRAN. E-UTRAN provides user equipment with wireless radio frequency (RF) channel connectivity to the core network EPC. The core network EPC provides a UE connected to the core network via an E-UTRAN radio channel with a communications connection to a PDN via an internet protocol (IP) packet flow "pipeline", conventionally referred to as a "bearer". The acronym LTE is conventionally used when referring to an evolved packet system (EPS) network comprising both the LTE E-UTRAN and the evolved packet core EPC, and network 20 shown in FIG. 1 may be referred to as LTE network 20, or simply LTE.

E-UTRAN comprises a network of RF communication base stations referred to as evolved NodeB (eNodeB) base stations. Each eNodeB comprises an RF transceiver and integral controller that controls the RF transceiver to establish radio communication channels between UEs in a limited geographic region referred to as a cell, and the core network EPC. Legacy base stations, referred to as NodeB base stations used in 3G networks, do not comprise integral controllers but are connected to radio network controllers (RNCs), operate using RF transmission technologies different from those used by eNodeBs and have limited functionalities in comparison to eNodeB base stations. Core network EPC is capable of communicating with and connecting a UE connected to a NodeB with a PDN network, and LTE network 20 is schematically shown connected to a NodeB base station of 3G network 19 via an RNC and a Serving GPRS (General Packet Radio Service) Support Node, (SGSN) of the 3G network. The SGSN node is responsible for delivery of packets from and to UEs that are connected to a NodeB base station rather than an eNodeB base station. The SGSN is connected to the Internet via a GGSN (GPRS Gateway Support Node). Whereas in FIG. 1 mobile network 18 is shown comprising a E-UTRAN having two eNodeBs and a 3G network having one NodeB, an LTE may and typically does comprise more than two eNodeBs and a 3G network comprising more than one NodeB.

Core network EPC of LTE 20 comprises a plurality of logical nodes, which are supported by virtual and/or physical network entities. The network nodes include, a Serving Gateway (SGW), a PDN gateway (PGW), a Home Subscriber Server (HSS), a Mobile Switching Center (MSC) server, and a Mobile Management Entity (MME). The SGW is a node of the LTE network through which data packets from a UE connected to an eNodeB enter the EPC to be propagated from the UE through the EPC to their destinations, or exit the EPC to propagate to the eNodeB and the UE after propagating through the EPC from their sources. The SGW serves as a local mobility anchor for data bearers when the UE moves between cells of different eNodeBs. The PGW is a node through which UE data packets from a UE connected to the EPC exit the EPC to propagate to a PDN or enter the EPC from a PDN to propagate to the UE. The PGW is responsible for allocating an IP address to the UE and handling various administrative and charging tasks in accordance with information received by the PGW from a node referred to as a Policy and Charging Rules Function (PCRF) node. The HSS node contains user subscription data, such as a QoS profile and any restriction that might limit user roaming. The HSS also contains dynamic information such as an identity of an MME to which the user UE may currently be connected. The MSC node supports signaling between an MME and a UE Subscriber Identity Module (SIM) and Short Message Services (SMS) for a UE connected to the EPC via a NodeB.

The MME is a central control and signaling node that communicates with and orchestrates the activities of the other nodes and the UE in managing the resources of the LTE to establish, route, and maintain IP packet flow between a UE and a PDN. An EPC generally comprises more than one MME and may hand over connection to a UE from one to another of the MMEs as the UE moves between cells of different eNodeBs. In FIG. 1 LTE 20 is shown comprising two MMEs, a first MME 31 represented by a solid line rectangle and indicated by dotted lines as communicating with UEs shown in the figures, and a second MME 32, shown in dashed lines, to which first MME 31 may hand over UEs as the UEs move between cells.

Communication between two nodes in an LTE network is governed by an interface that configures what data the nodes exchange, how packets that contain the data are formatted, and how the packets are transmitted between the nodes. Communication between different node pairs is typically governed by different interfaces. An interface that configures communications between two nodes is indicated in FIG. 1 by an alphanumeric identifying the interface shown in an ellipse overlying a dashed or solid line that extends between the two nodes. For example, eNodeBs in an LTE network exchange control signaling via an X2 interface, and an X2 is shown in an ellipse overlying a dashed line shown connecting the two eNodeBs in LTE network 20, and a UE communicates with an eNodeBs via a Uu interface shown in an ellipse overlying a solid line between the UE and the eNode B. Similarly as indicated in FIG. 1, the MME node communicates control data with an eNodeB via an S1-MME interface. The S1-MME interface defines data to be exchanged and packet formatting in accordance with an S1-AP protocol and configures transmission of the data between the MME and the eNodeB using the SCTP (Stream Control Transmission Protocol) transport protocol. The MME node communicates with the SGW node via an S11 interface, which tunnels UDP packets between the nodes using a General Packet Radio Service Tunneling Protocol (GTP) referred to as GTP-C. And, the HSS communicates with the MME via an S6a interface that configures data in accordance with a Diameter protocol and transmits Diameter messages using SCTP.

FIG. 2 schematically shows a Smart-vLB 100 coupled to LTE network 20 operating to load balance processing of data comprised in control packets transmitted between MME node 31 and other nodes in the LTE network, in accordance with an embodiment of the disclosure. By way of example, Smart-vLB 100 is assumed to comprise two, optionally virtual, non-Stateful load balancers, NS-vLBs, 101 and 102, and two, optionally virtual, Stateful load balancers, S-vLB 110 and S-v1B 111, and is shown load balancing packets it receives from LTE network 20 between, optionally three, vProbes 121, 122, and 123.

It is noted that whereas Smart-vLB 100 is schematically shown in FIG. 2 and assumed to comprise virtual component entities, any or any combination of component entities of a Smart-vLB in accordance with an embodiment, such a non-Stateful load balancer and/or a Stateful load balancer may comprise and/or have access to any of various physical and/or virtual processors and memories that may be required to support functionalities for which the component entities are responsible. A component entity may be a physical or virtual entity or a combination of physical and virtual entities and may comprise or have access to a memory having any electronic and/or optical circuitry suitable for storing data and/or computer executable instructions. The memory may, by way of example, comprise or have access to any one, or any combination of more than one of a flash memory, random access memory (RAM), read only memory (ROM), and/or erasable programmable read-only memory (EPROM). Similarly, a component entity may comprise and/or have access to a processor having any electronic and/or optical processing circuitry configured to operate and provide functionalities that the component entity may require. The processor may by way of example comprise any one, or any combination of more than one of, a standard x86 processor, microprocessor, an application specific circuit (ASIC), field programmable array (FPGA) and/or system on a chip (SOC).

Smart-vLB 100 is shown in FIG. 2 by way of example coupled to LTE 20 to receive control packets mirrored from interfaces S1-MME, S3, and Gn, S11, Sv and SGs, S6a and S10 between MME 31, and eNodeBs, SGSN, SGW, MSC, HSS, and MME32, respectively. Link controllers (not shown) in MME 31 are configured to distribute substantially equal numbers of mirrored packets from LTE network 20 to each non-Stateful vLB, NS-vLB 101 and 102. Diameter packets mirrored to Smart-vLB 100 from interface S6a and GTP-C tunneled packets mirrored from interfaces, Sv, S3, S11 and S10 are selected as contextual packets. Packets mirrored to Smart-vLB 100 from interfaces S1-MME and SGs are considered non-contextual packets. Each NS-vLB 101 and 102 forwards non-contextual packets that it receives in substantially equal numbers to a given vProbe 121, 122, and 123 without reference to data in another packet. On the other hand, both NS-vLB 101 and 102 forward Diameter packets that they receive to S-vLB 111, and GTP-C packets they receive to S-vLB 110. Each S-vLB load balancer forwards a packet it receives to a vProbe 121, 122, or 123 having an identity which the S-vLB determines based on information from at least one of a plurality of other packets that it receives.

For convenience of reference, S-vLBs 110 and 111 are labeled by the types of packets they respectively receive. S-vLB 110 is labeled "GTP-C" and S-vLB 111 is labeled "Diameter".

Figure 3:
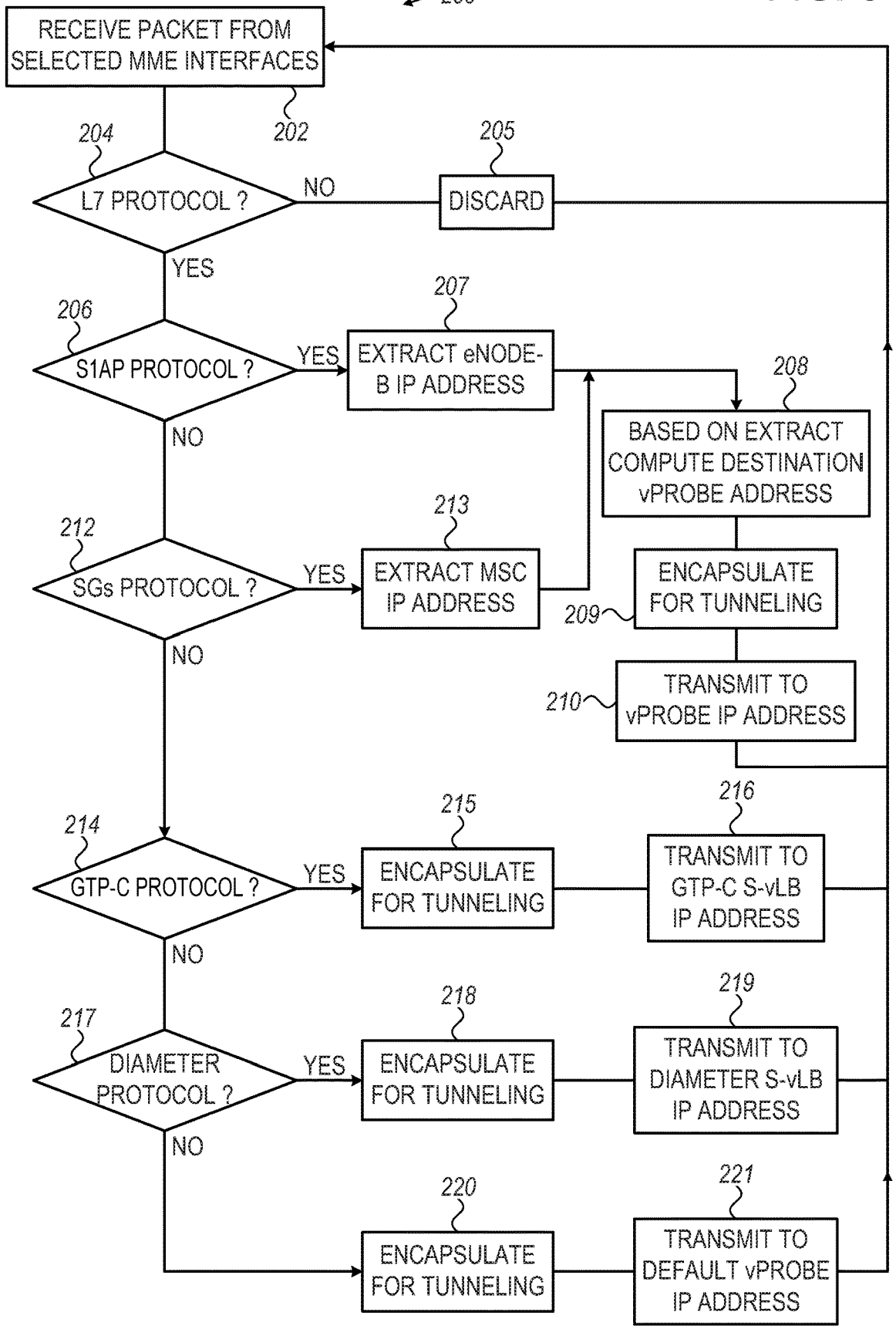
FIG. 3 shows a flow diagram of a procedure by which the NS-vLBs comprised in the Smart-vLB shown in FIG. 2 distribute packets that the Smart-vLB receives from the LTE network, in accordance with an embodiment of the disclosure.

FIG. 3 shows a flow diagram of an algorithm 200 by which NS-vLB 101 or NS-vLB 102, generically referred to as an NS-vLB, may determine where to forward packets they receive, in accordance with an embodiment of the disclosure.

In a block 202 the NS-vLB receives and optionally time stamps a packet from the selected MME interfaces shown in FIG. 2, and in a decision block 204 determines if the packet contains Application, Layer 7 of the Open System Interconnection (OSI) model, data. If the packet does not contain L7 data, in a block 205 the NS-vLB discards the packet and returns to block 202. If on the other hand it is an L7 packet, NS-vLB may proceed to a block 206 to determine if the packet is an SLAP protocol packet. If it is, NS-vLB optionally proceeds to a block 207 and extracts an eNode-B IP address of an eNodeB from which or to which the packet was sent. Based on the extracted eNodeB IP address, NS-vLB computes, optionally in a block 208, an address of a destination vProbe, to which to forward the packet. By way of example, to compute a vProbe destination address, in block 208 NS-vLB may hash the extracted IP address, and use a look-up table (LUT) that maps hashes of IP addresses of eNodeBs from which MME 31 may receive a packet to determine to which vProbe, 121, 122, or 123 to forward the packet. In a block 209 NS-vLB may encapsulate the packet for tunneling to the determined destination vProbe address, and in a block 210 may transmit the packet to the destination vProbe. Any suitable tunneling protocol such as the GRE (General Routing Encapsulation) tunneling protocol may be used in block 210 to tunnel the packet to the destination vProbe. After transmitting the S1AP packet to its destination vProbe, NS-vLB returns to block 202 to receive another packet from the selected MME interfaces.

If a packet received by NS-vLB is found to be an L7 packet in decision block 204, but not an S1AP packet in decision block 206, NS-vLB may proceed to determine in a decision block 212 if the received packet is an SGs protocol packet. If the packet is an SGs packet, optionally in a block 213, NS-vLB extracts an MSC IP address from the packet. Optionally, in blocks 208, 209, 210, NS-vLB proceeds to determine an IP address of a destination vProbe 121, 122, or 123, to which to forward the packet based on the extracted MSC IP address, and tunnel the packet to the destination vProbe. Thereafter, NS-vLB may return to block 202 to receive another packet.

If a received packet is determined to be an L7 packet but not an S1AP or SGs packet, NS-vLB may proceed from decision block 212 to a decision block 214 to determine if the packet is a GTP-C packet. If it is a GTP-C packet, NS-vLB may proceed to blocks 215 and 216 to tunnel the packet to GTP-C stateful load balancer S-vLB 110 (FIG. 2). Following transmission of the packet to GTP-C S-vLB 110, NS-vLB may return to block 202 to receive another packet. If on the other hand in decision block 214 NS-vLB finds that the packet is not a GTP-C packet, NS-vLB may proceed to a block 217 to determine if the packet is a Diameter packet. If it is a Diameter packet, NS-vLB may proceed to blocks 218 and 219 to tunnel the packet to Diameter stateful load balancer S-vLB 111 (FIG. 2), and thereafter return to block 202.

If on the other hand, in decision block 217 NS-vLB finds that the packet is not a Diameter packet, NS-vLB may proceed to blocks 220 and 221 to tunnel the packet to a default vProbe or vProbe group, which may be any one of vProbes 121, 122, or 123 and thereafter return to block 202.

Figure 4A:
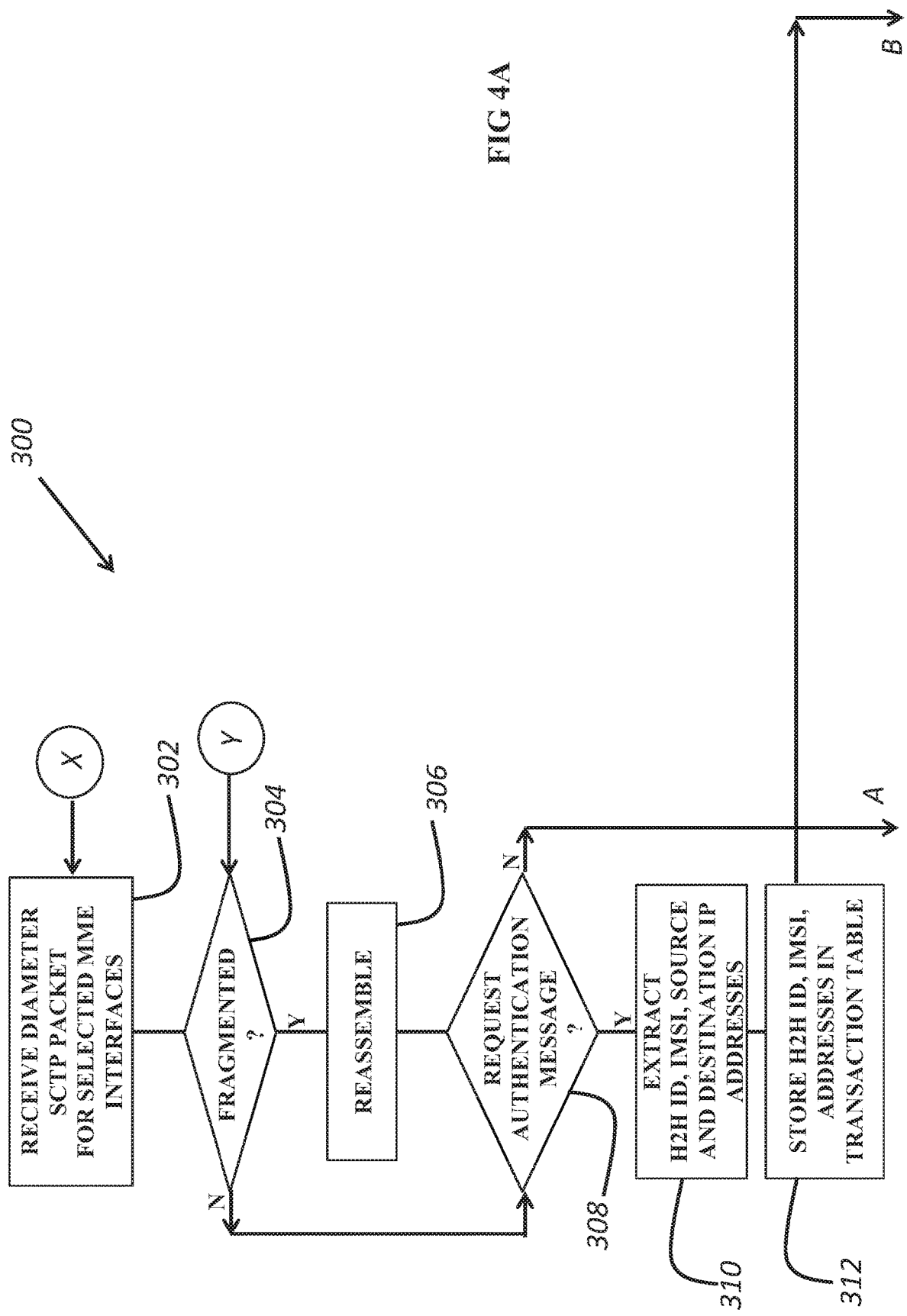
FIGS. 4A and 4B show a flow diagram of a procedure by which one of the S-vLBs comprised in the Smart-vLB shown in FIG. 2 distribute packets that it receives from a NS-vLB in the Smart-vLB, in accordance with an embodiment of the disclosure.
Figure 4B:
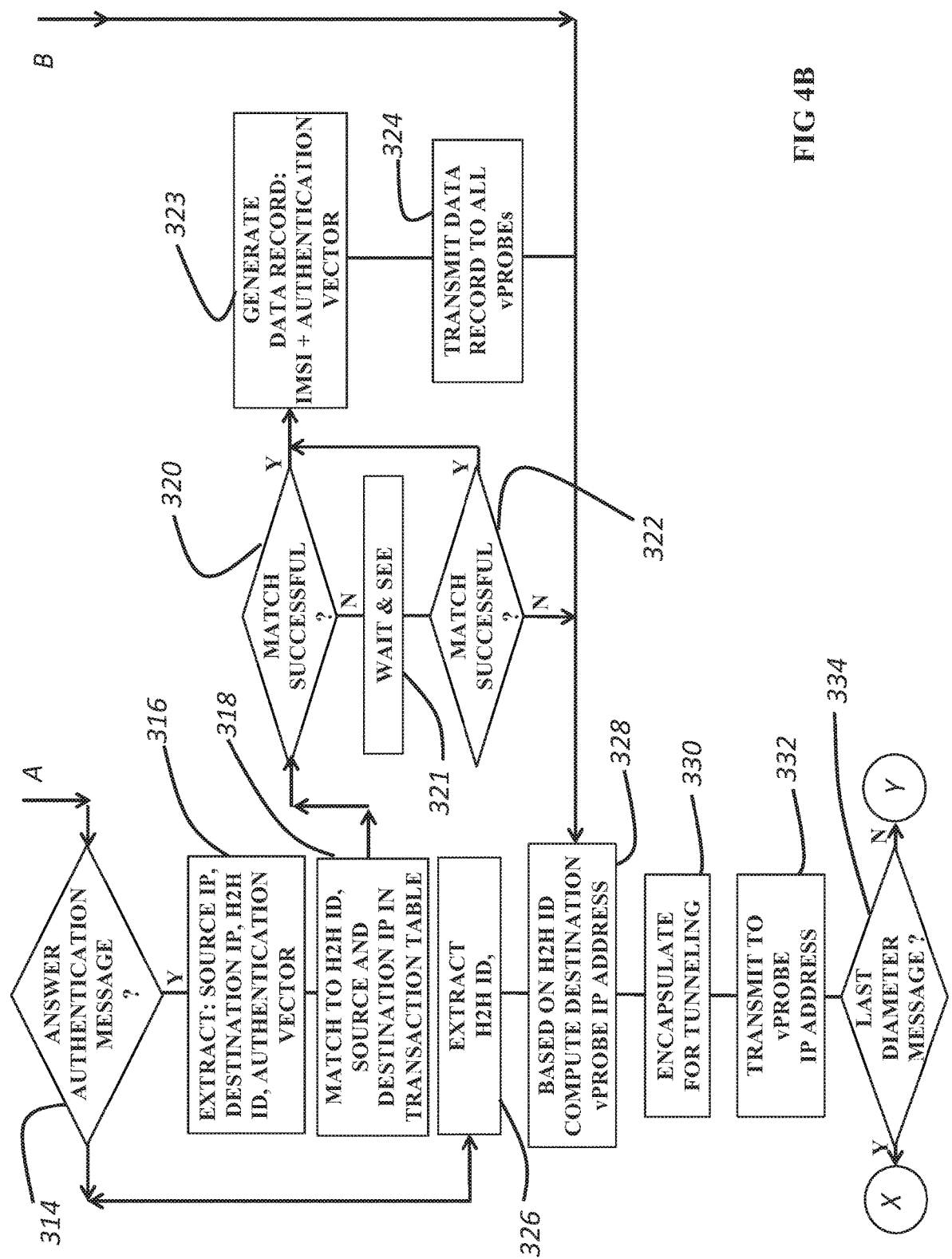

FIGS. 4A-4B show a flow diagram of an algorithm 300 by which, optionally, Diameter stateful virtual load balancer S-vLB 111 (FIG. 2) processes Diameter packets it receives from non-stateful NS-vLB load balancers 101 and 102.

In a block 302 Diameter stateful load balancer S-vLB 111 receives an SCTP (Stream Control Message Protocol) packet comprising one or more complete and/or fragmented Diameter messages. In a decision block 304 load balancer S-vLB 111 determines if the SCTP packet comprises fragmented Diameter messages or a single, complete, non-fragmented, Diameter message. If the packet is a "fragmented packet", comprising fragmented Diameter messages, load balancer S-vLB 111 proceeds to a block 306 and reassembles a Diameter message, a fragment of which is comprised in the SCTP packet. Reassembly comprises aggregating a sufficient number of SCTP packets to provide load balancer S-vLB 111 with a sufficient number of fragments to enable reassembly of a complete Diameter message. Following reassembly, load balancer 111 may proceed to a decision block 308. If in decision block 304, load balancer S-vLB 111 determines that the SCTP packet received in block 302 is not fragmented, load balancer S-vLB 111 may proceed directly to decision block 308.

In decision block 308 load balancer S-vLB 111 optionally determines if the Diameter message is an Authentication Information Request message, and if it is, may proceed to a block 310 in which the load balancer extracts an IMSI (International Mobile Subscriber Identity) and a hop-to-hop identifier (H2H ID), source and destination IP addresses that respectively identify a UE associated with the Diameter message and a session in which the UE is engaged. In a block 312 load balancer 111 stores the IMSI, H2H ID, and source and destination addresses in a transaction table that the load balancer maintains in a memory. Thereafter the load balancer may proceed to a block 328 in which, based on the extracted H2H ID it determines an IP address of a vProbe 121, 122, or 123, to which the load balancer will forward the packet or packets containing the Diameter message for processing. In a block 330 load balancer S-vLB 111 encapsulates the Diameter message packet or packets for tunneling to the determined IP address, and in a block 332 transmits the Diameter message to the vProbe IP address.

In a block 334, load balancer S-vLB 111 determines if the transmitted Diameter message is a last Diameter message in the SCTP packet. If it is, load balancer S-vLB 111 proceeds to a junction "X" and returns to block 302 to receive and process another SCTP packet. On the other hand, if it is not a last Diameter message, load balancer S-vLB 111 may proceed to a junction "Y" and returns to block 304 to determine if there is another Diameter message in the packet for processing and if it is fragmented.

In processing a Diameter message, if in decision block 308 load balancer S-vLB 111 determines that the Diameter message is not an Authentication Information Request message, the load balancer may proceed to a decision block 314 to determine if the Diameter message is a response to an Authentication Information Request message. If the message is not a response to an Authentication Information Request message load balancer S-vLB 111 may proceed from decision block 314 to a block 326 to extract a H2H ID from the message and in blocks 328-332 to transmit the message to a vProbe having an IP address determined from the H2H ID. In block 334 the load balancer determines whether to return to block 302 and receive another SCTP packet or to block 304 to process another Diameter message comprised in the current SCTP packet.

If in block 314 load balancer S-vLB 111 determines that the Diameter message is an Authentication Information Answer message the load balancer may proceed to a block 316 and extract an H2H ID from the message. In a block 318 the load balancer may attempt to match the extracted H2H ID, source and destination IP addresses with an H2H ID, source and destination IP addresses message previously logged into the transaction table to identify a Diameter Authentication Information Request message with which the Authentication Information Answer message is associated. In a decision block 320, if the matching attempt is successful, Diameter load balancer S-vLB 111 proceeds to a block 323 and generates a data record comprising the authentication vector extracted in block 316 from the Diameter Authentication Information Answer message and the IMSI extracted from the associated Diameter Authentication Information Request message. The combination of an encryption key comprised in the authentication vector and the IMSI enable a vProbe 121, 122, or 123 to decipher a packet that it receives which is associated with the session associated with the IMSI. In a block 324 load balancer S-vLB 111 may transmit the data record to each of vProbes 121, 122, and 123.

Optionally, following transmission of the data record, load balancer S-vLB 111 may proceed to blocks 328-332 to determine a destination IP address of a vProbe 121, 122, or 123 to which the Diameter Authentication Information Answer message should be sent. The destination IP address determined for the Authentication Information Answer message is based on the H2H ID associated with the Authentication Information Answer message, which H2H ID is shared with the Authentication Information Request message matched to the Authentication Information Answer message in block 318. As a result, the vProbe IP address determined for the Diameter Authentication Information Answer message is the same as the vProbe IP address determined for the associated Diameter Authentication Information Request message. And in block 332, after encapsulation in block 330, the Diameter Authentication Information Answer message is transmitted to the same vProbe for analysis to which the associated Diameter Authentication Information Request message was sent. After transmission of the Diameter Authentication Information Answer, message load balancer 111 may proceed to block 334 to determine whether to return to block 302 and receive another SCTP packet or to block 304 to process the next Diameter message in the current SCTP packet. It is noted that whereas in the above description load balancer S-vLB 111 proceeds to blocks 328-332 after having generated and transmitted an associated data record, in an embodiment load balancer S-vLB 111 may generate and transmit the data record after having proceeded to execute, or during execution of, blocks 328-332.

In a case for which in decision block 320 load balancer S-vLB 111 determines that matching in block 318 has failed, the load balancer may proceed to perform a "Wait and See" procedure. In the Wait and See procedure load balancer S-vLB 111 stores the Diameter Authentication Information Answer message in a holding memory, optionally a RAM (random access memory). In the holding memory the Diameter message may be stored with other messages in order of their respective time stamps provided by the non-Stateful load balancer NS-vLB 101 or NS-vLB 102 from which the message was forwarded to load balancer S-vLB 111. In an embodiment, the load balancer S-vLB 111 processes the message in order of its time stamp following a predetermined from a time at which the message was stored in the holding memory to make at least one additional attempt at matching the Authentication Information Answer message with an Authentication Information Request message. If in a decision block 322 the at least one additional attempt is successful, load balancer S-vLB 111 may proceed to blocks 323 and 324 to generate and transmit an IMSI plus authentication vector data record to all vProbes 121, 122, and 123. If however, in decision block 322 load balancer 111 determines that the at least one additional attempt has failed, the load balancer may proceed to execute blocks 328-334.

Figure 5A:
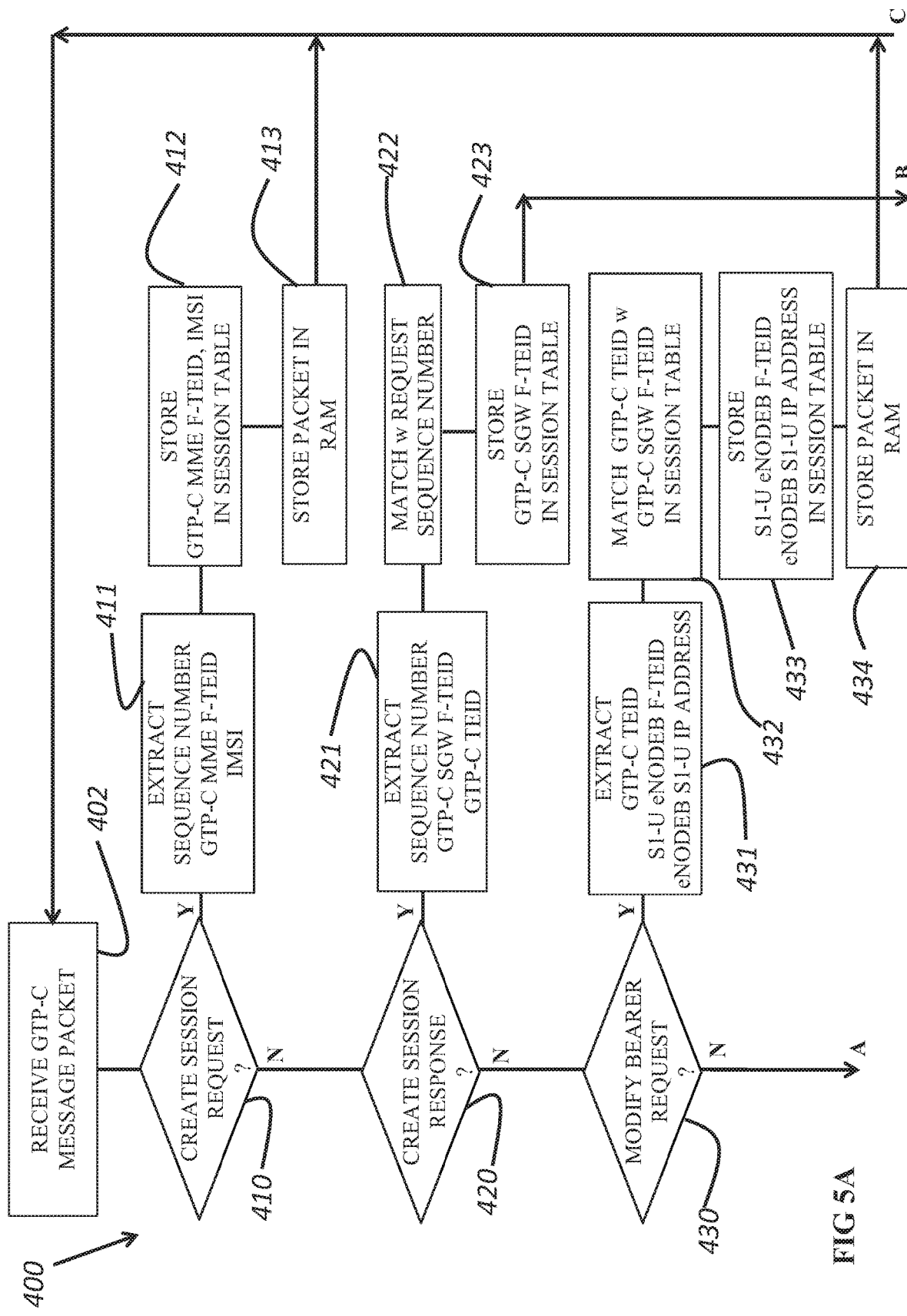
FIGS. 5A-5C show a flow diagram of a procedure by which another of the S-vLBs comprised in the Smart-vLB shown in FIG. 2 distribute packets that it receives from a NS-vLB in the Smart-vLB, in accordance with an embodiment of the disclosure.
Figure 5B:
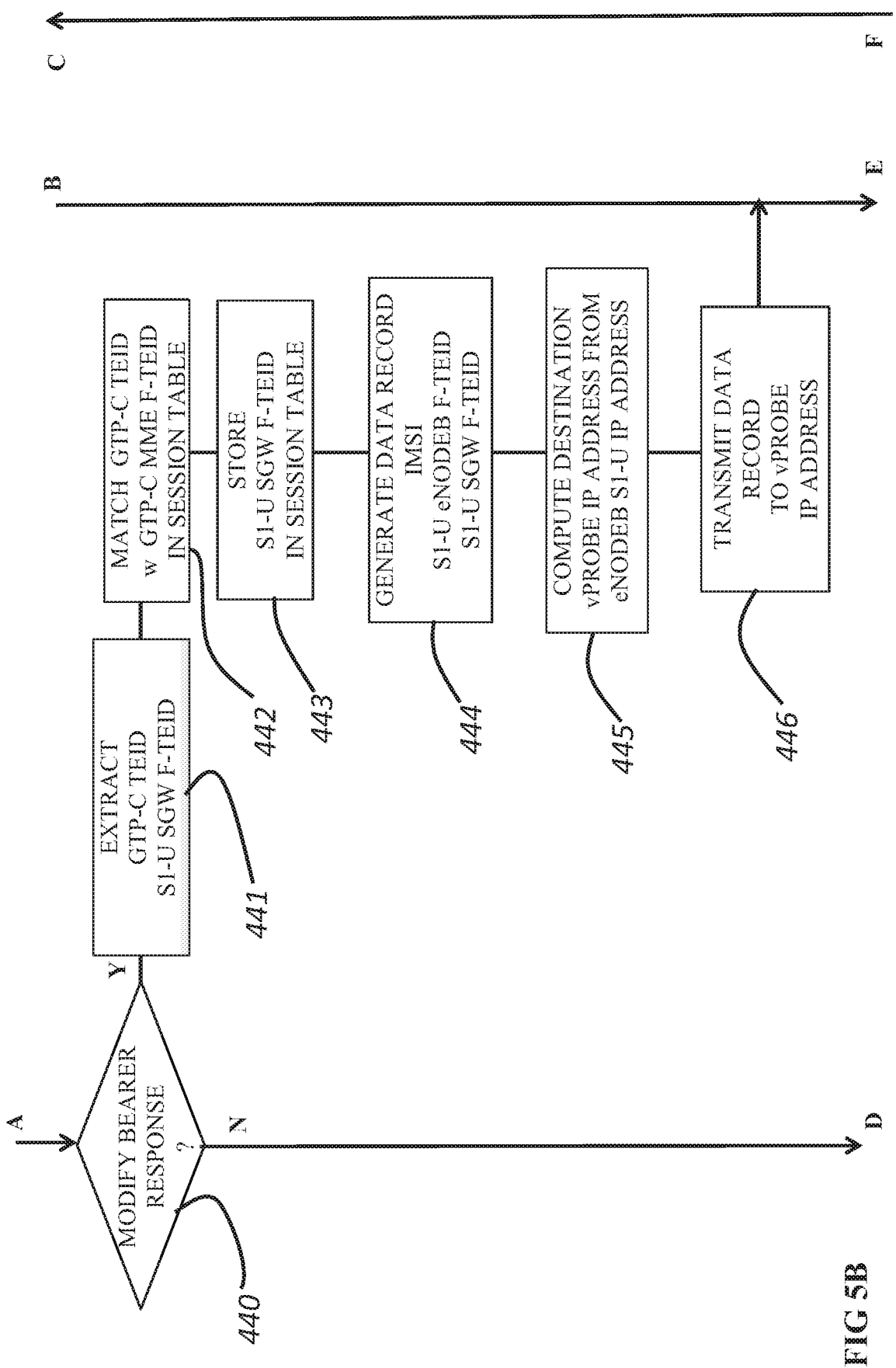
Figure 5C:
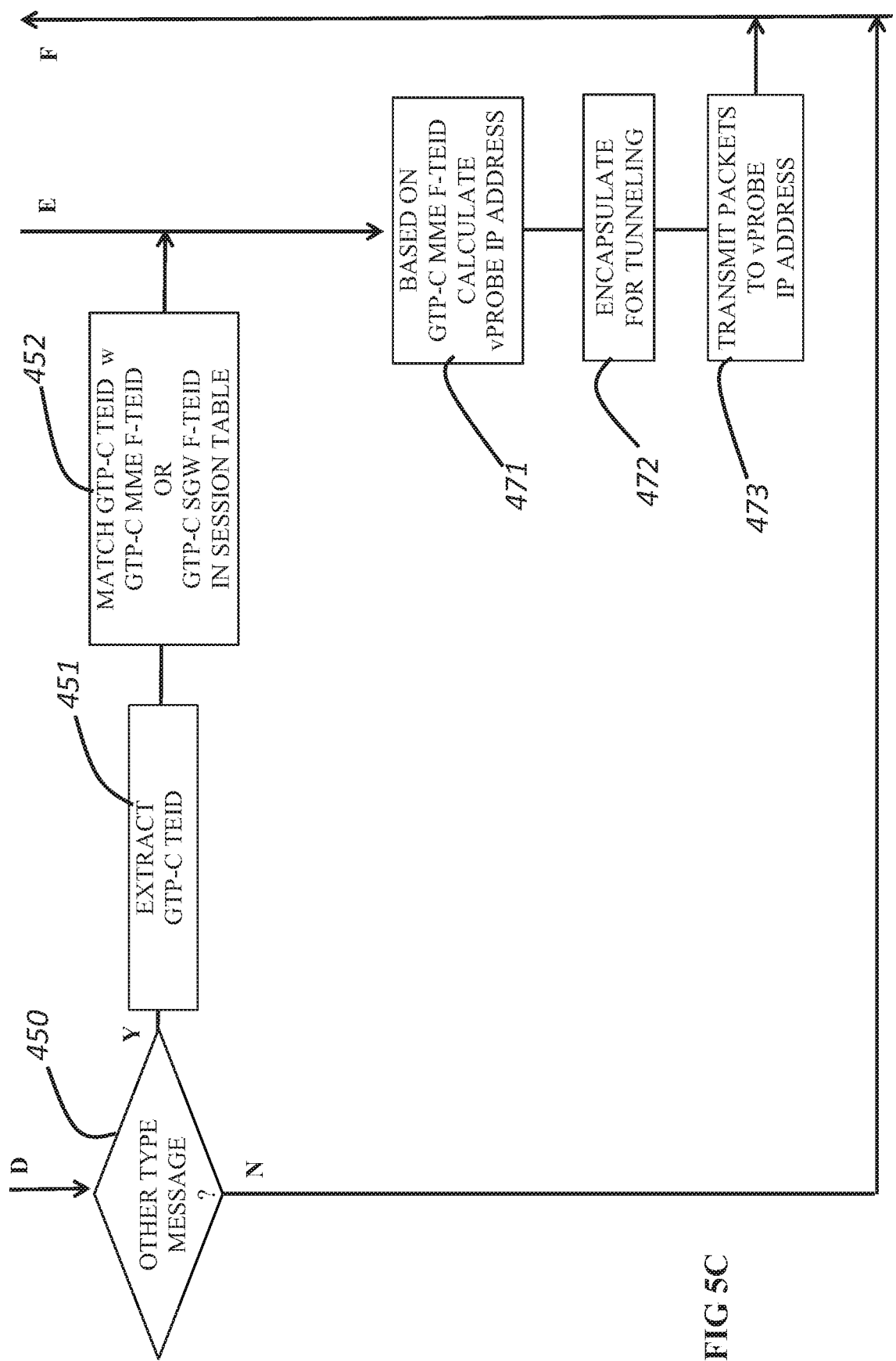

In an embodiment, to reduce a probability that an Authentication Information Answer message reaches Diameter load balancer S-vLB 111 before the associated Authentication Information Request message reaches the load balancer, the load balancer may store all Diameter messages that it receives in a holding memory prior to attempting to match messages. The load balancer holds the messages in the holding memory for a given delay time before processing to reduce the probability that the load balancer will not find a match for an Authentication Information Answer FIGS. 5A-5C show a flow diagram of an algorithm 400 by which, optionally, GTP-C, stateful virtual load balancer S-vLB 110 (FIG. 2) processes GTP-C packets it receives from non-stateful NS-vLB load balancers 101 and 102.

In a block 402 load balancer S-vLB 110 receives a GTP-C message packet, and optionally in a block 410 determines if the message is a create session request. If it is, in a block 411 the load balancer extracts a sequence number, an IMSI, and a GTP-C MME F-TEID (Fully Qualified Tunnel Endpoint Identifier) located in the packet payload. In a block 412 load balancer S-vLB 110 may store the MME F-TEID and IMSI in a session table that the load balancer maintains, and in a block 413 stores the packet in a holding memory, optionally a RAM. From block 413 the load balancer may return to block 402 to receive another packet.

If in decision block 410 load balancer S-vLB 110 determines that the message is not a create session message, the load balancer may proceed to a decision block 420 to determine if the message is a create session response message. If it is, load balancer S-vLB 110, optionally in a block 421, extracts a sequence number and a GTP-C SGW F-TEID and optionally proceeds to find a match for the extracted sequence number with a previously extracted create session request sequence number stored in the session table. Load balancer S-vLB 110 may store the GTP-C SGW F-TEID in the session table and optionally proceed to a block 471. In block 471 based on the GTP-C MME F-TEID extracted from the associated create session request and stored in the session table in block 412, load balancer 110 determines an IP address for a vProbe 121, 122, or 123 to which to send for processing the session response packet and its associated session request packet stored in block 413 in RAM. In a block 472, the load balancer encapsulates the packets for tunneling, and in a block 473 transmits the encapsulated packets to the determined IP-address of the destination vProbe. Load balancer S-vLB 110 may then return to block 402 to receive another GTP-C packet.

If in decision block 420 load balancer S-vLB 110 determines that the GTP-C message is not a create session response, the load balancer may proceed to a decision block 430 to determine if the message is a modify bearer request message. If it is, load balancer S-vLB 110 may proceed to a block 431 in which the load balancer extracts a GTP-C F-TEID an S1-U eNodeB F-TEID, and an eNodeB S1-U IP address from the packet. In a block 432 load balancer 110 matches the extracted GTP-C TEID with a GTP-C SGW F-TEID previously stored in the load balancer session table for a create session response and stores the S1-U eNodeB F-TEID and eNodeB S1-U IP address in the session table so that it may be associated with the create session response of the same GTP-C SGW F-TEID. In a block 434 the load balancer stores the packet in the holding memory RAM and may return to block 402 to receive another packet.

If in decision block 430 load balancer S-vLB 110 determines that the packet is not a modify bearer request, the load balancer may continue to a decision block 440 to determine if the message is a modify bearer response message. If it is a modify bearer response message, the load balancer may proceed to a block 441 to extract a GTP-C F-TEID from the packet as well as an S1-U SGW F-TEID, and in a block 442 match the extracted GTP-C F-TEID with a GTP-C MME F-TEID previously stored in the session table. In a block 443 load balancer S-vLB 110 stores the extracted S1-U SGW F-TEID in the session table so that it may be associated with the other data in the session table having the same GTP-C MME-TEID. In a block 444 load balancer S-vLB 110 generates a data record comprising the IMSI, S1-U eNodeB F-TEID, and the S1-U SGW F-TEID that are stored in the session table and associated with the same GTP-C MME F-TEID. In a block 445 the load balancer may determine a vProbe IP address based on the eNodeB S1-U IP address extracted in block 431 for the modify bearer request associated with the modify bearer response. And in a block 446 the load balancer may transmit the data record to the vProbe 121, 122, or 123 having the determined vProbe IP address. Load balancer S-vLB 110 may then proceed to blocks 471-473 to transmit the associated modify bearer request and modify bearer response packets for processing to a vProbe having an IP address determined from the GTP-C MME F-TEID that is associated with the modify session request and response packets. The vProbe to which the associated modify bearer request and modify bearer response packets are sent is also the same vProbe to which the create session request and response packets associated with the same GTP-C MME F-TEID were transmitted. From block 473 the load balancer may return to block 402 to receive another packet.

In decision block 440 if load balancer S-vLB 110 determines that the packet is not a modify bearer response, the load balancer may proceed to a block 450 to determine if the packet is another type of message packet different from a create session or modify bearer request. If it is, in a block 451 the load balancer extracts a GTP-C TEID from the packet and in a block 452 matches the extracted GTP-C TEID with a GTP-C MME TEID or a GTP-C SGW F-TEID previously stored in the session table. Load balancer S-vLB 110 may then proceed to blocks 471-473 to transmit the packet to a vProbe having an IP address determined from the GTP-C MME F-TEID associated with the session to which the create session request and response packets associated with the same GTP-C MME F-TEID belong. The load balancer may then proceed to block 402 to receive another packet.

It is noted that whereas a Wait and See procedure is described with respect to load balancer S-vLB 111 it may also be used where necessary by load balancer S-vLB 110.

Figure 6:
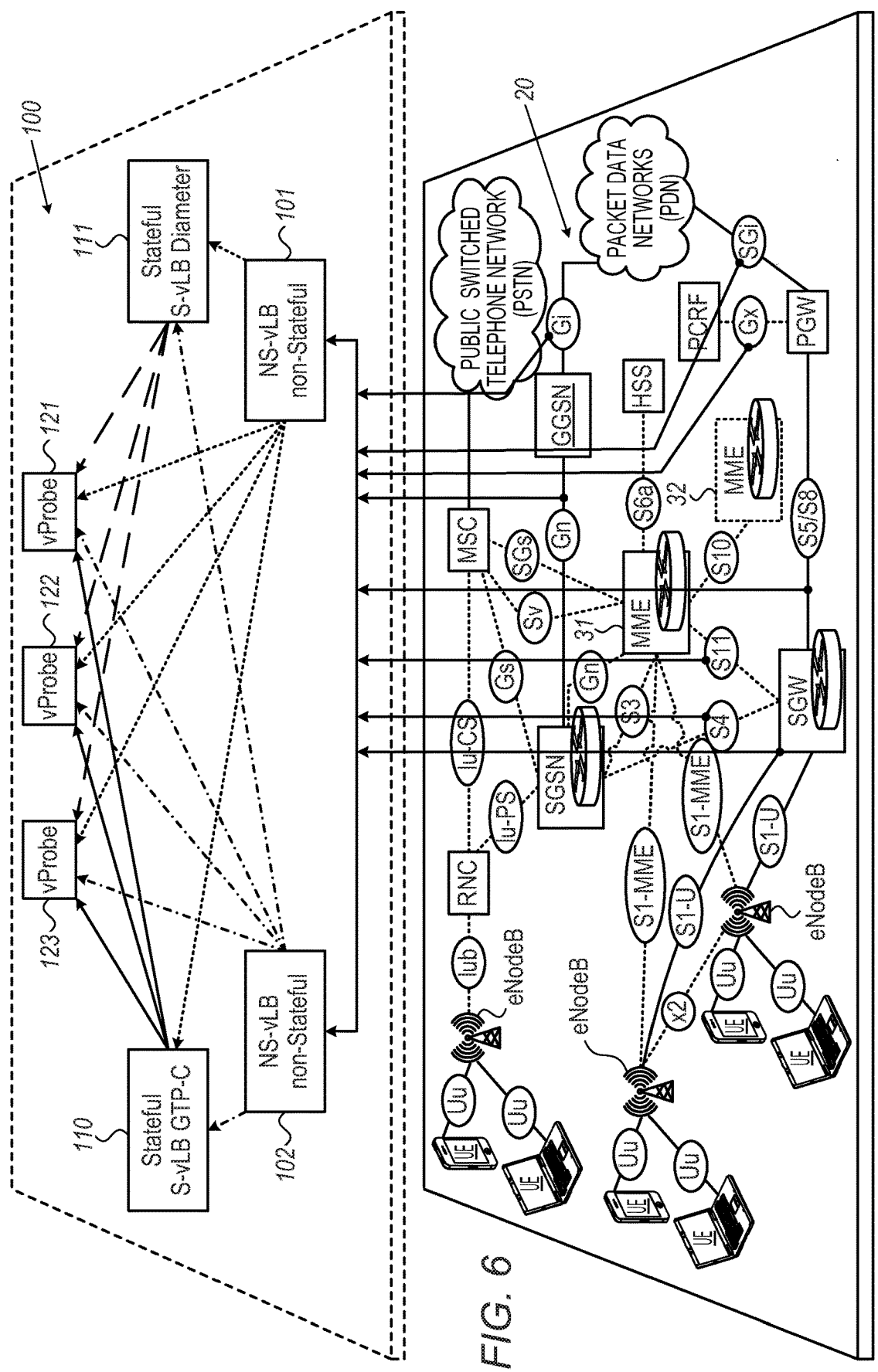
FIG. 6 schematically shows a Smart-vLB comprising NS-vLBs and S-vLBs operating to load balance processing of data comprised in control packets propagated to and from a Serving Gateway (SGW), and/or a Packet Data Network Gateway (PGW) of the LTE shown in FIG. 1, in accordance with an embodiment of the disclosure.

The above discussion describes a Smart-vLB system balancing data processing for packets transmitted via MME interfaces in accordance with an embodiment of the disclosure. However, a Smart-vLB in accordance with an embodiment is not limited to load balancing for packets transmitted via MME interfaces, and may be configured to load balance for communication interfaces via which entities of a network other than an MME communicate. By way of example, FIG. 6 schematically shows a Smart-vLB 100 coupled to LTE network 20 operating to load balance processing of data comprised in control plane and user plane packets transmitted between the SGW node, the PGW node, and other nodes in the LTE network, in accordance with an embodiment of the disclosure. In the figure Smart-vLB 100 is shown by way of example coupled to LTE 20 to receive and load balance packets mirrored from interfaces S1-U, S4, S11, S5/S8, SGi, Gn, Gi, Gx. A Smart-vLB may simultaneously be coupled to interfaces of more than one network entity and be configured to substantially simultaneously be responsible for load balancing communications for all the more than one network entity.

Figure 7A:
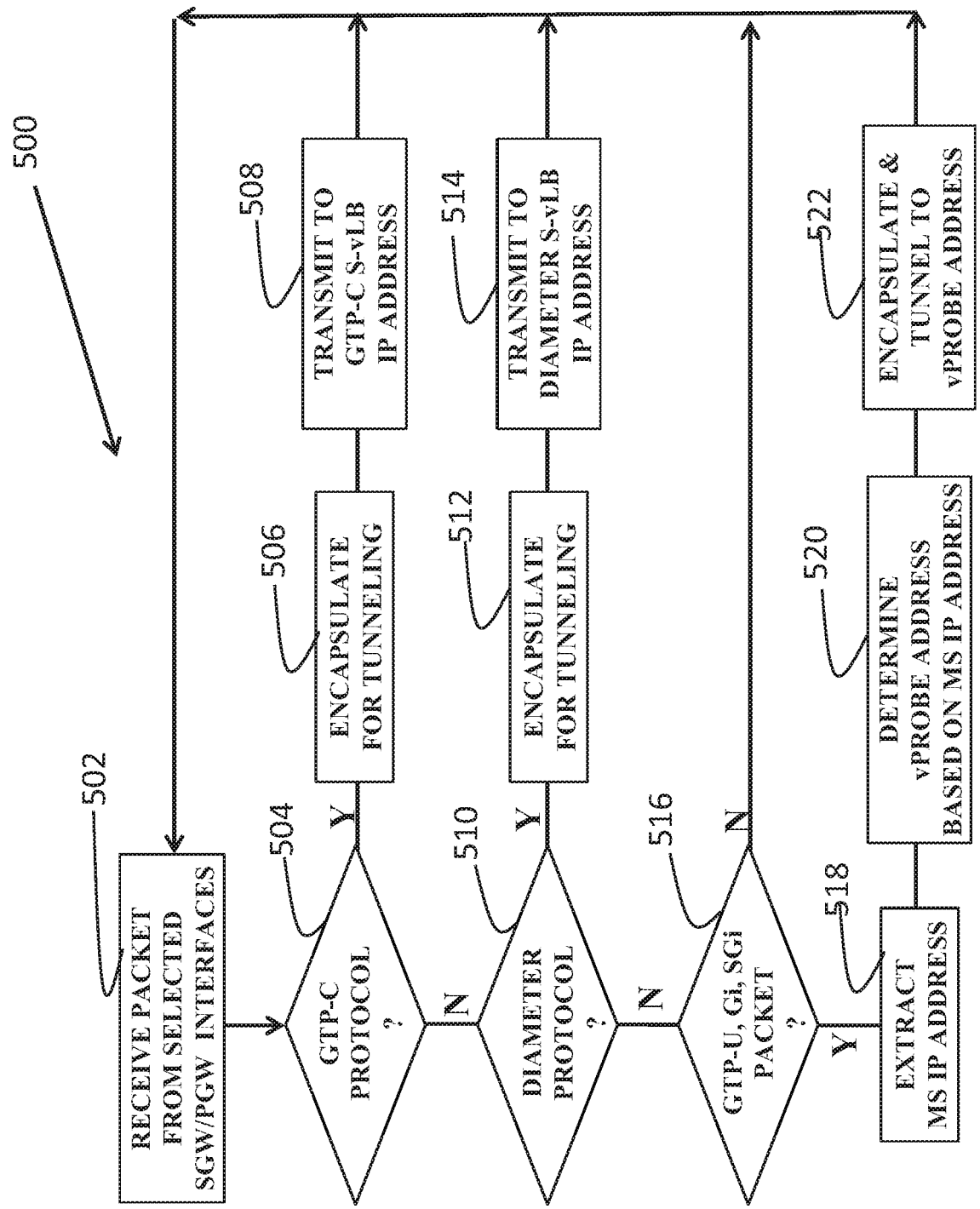
FIGS. 7A and 7B show flow diagrams of procedures by which and NS-vLB and an S-vLB comprised in the Smart-vLB shown in FIG. 6 operate to distribute packets, in accordance with an embodiment of the disclosure.

FIG. 7A shows a flow diagram of an algorithm 500 by which NS-vLB 101 or NS-vLB 102, may determine where to forward packets they receive from an SGW or PGW interface to which Smart-vLB 100 is coupled, in accordance with an embodiment of the disclosure.

In a block 502 the NS-vLB (NS-vLB 101 or NS-vLB 102) receives and optionally time stamps a packet from the selected SGW interfaces shown in FIG. 6, and in a decision block 504 determines if the packet contains a GTP-C protocol; packet. If it is a GTP-C packet, NS-vLB may proceed to blocks 506 and 508 to tunnel the packet to GTP-C stateful load balancer S-vLB 110 (FIG. 6). Following transmission of the packet to S-vLB 110, NS-vLB may return to block 502 to receive another packet. If on the other hand in decision block 504 NS-vLB finds that the packet is not a GTP-C packet, NS-vLB may proceed to a block 510 to determine if the packet is a Diameter packet. If it is a Diameter packet, NS-vLB may proceed to blocks 512 and 514 to tunnel the packet to Diameter stateful load balancer S-vLB 111 (FIG. 6), and thereafter return to block 502.

If on the other hand, in decision block 510 NS-vLB finds that the packet is not a Diameter packet, NS-vLB may proceed to decision block 516 to determine if the packet is a GTP-U, Gi, or SGi packet and if not, discards the packet or transmits the packet to a default vProbe, and returns to block 502 to receive another packet. On the other hand, if in decision block 510, NS-vLB determines that it is a GTP-U, Gu, or SGi packet, NS-vLB may proceed to a block 518. In block 518 NS-vLB may extract an MS IP (Mobile Station IP) address from the packet and in a block 520 the NS-vLB may determine an address for a destination vProbe, vProbe 121, 122, or 123, to which to transmit the packet for processing. In a block 522 NS-vLB encapsulates the packet for tunneling and transmits the encapsulated packet to the determined address of the destination vProbe. Following transmission NS-vLB may return to block 502 to receive another packet.

Figure 7B:
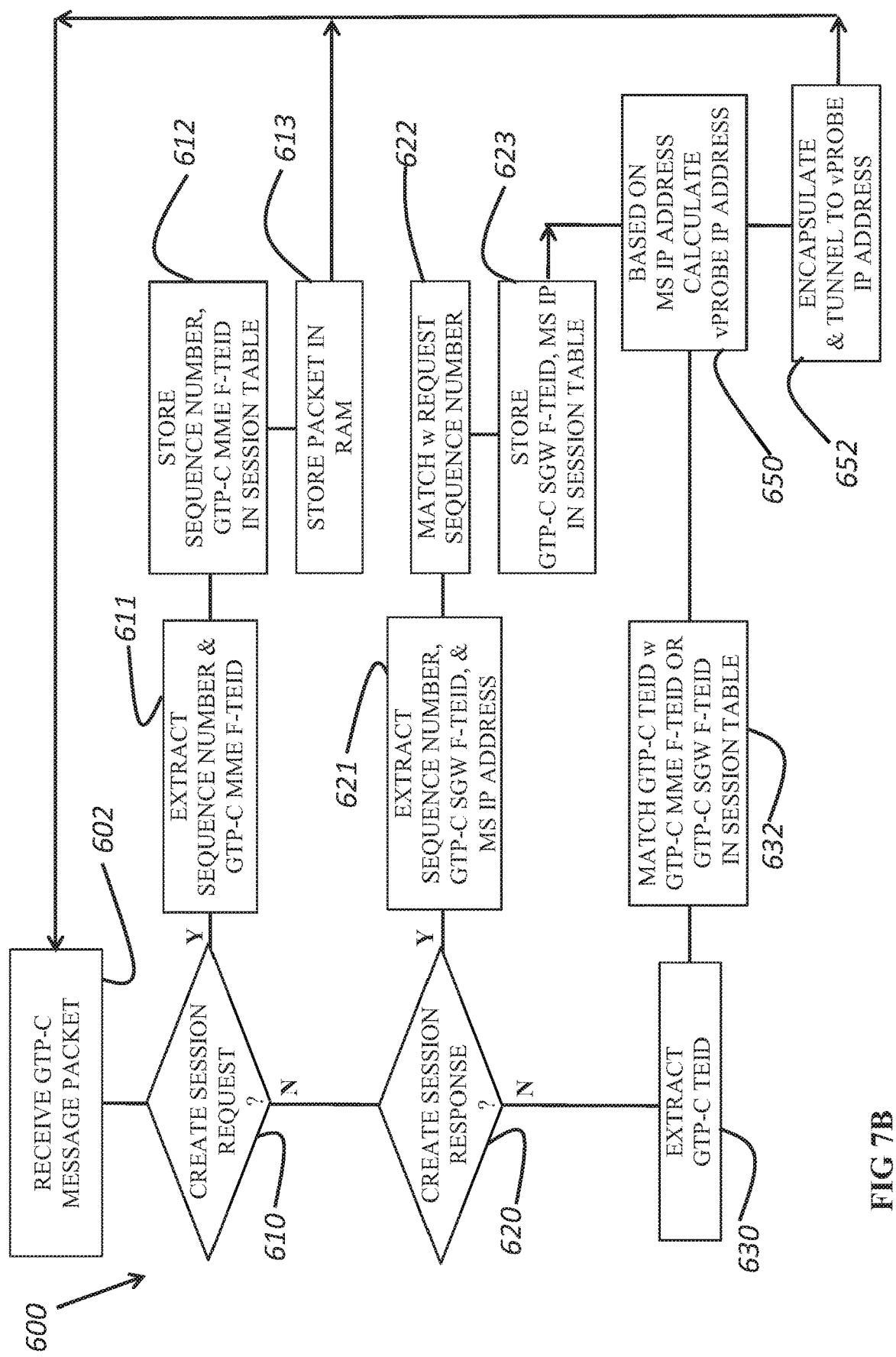

FIG. 7B shows a flow diagram of an algorithm 600 by which, optionally, GTP-C, stateful virtual load balancer S-vLB 110 (FIG. 6) processes a GTP-C packet mirrored from a SGW interface to which Smart-vLB 100 is coupled that S-vLB 110 receives from non-stateful NS-vLB load balancer 101 or 102.

In a block 602 load balancer S-vLB 110 receives a GTP-C message packet, and optionally in a block 610 determines if the message is a create session request. If it is, in a block 611 the load balancer extracts a sequence number, an IMSI, and a GTP-C MME F-TEID (Fully Qualified Tunnel Endpoint Identifier) located in the packet. In a block 612 load balancer S-vLB 110 may store the sequence number, MME F-TEID, and IMSI in a session table that the load balancer maintains, and in a block 613 stores the packet in a holding memory, optionally a RAM. From block 613 the load balancer may return to block 602 to receive another packet.

If in decision block 610 load balancer S-vLB 110 determines that the message is not a create session message, the load balancer may proceed to a decision block 620 to determine if the message is a create session response message. If it is, GTP-C virtual load balancer S-vLB 110, optionally in a block 621, extracts a sequence number, a GTP-C SGW F-TEID and a MS IP address. Thereafter in a block 622, S-vLB 110 optionally proceeds to find a match for the extracted sequence number with a previously extracted create session request sequence number stored in the session table. In a block 623 load balancer S-vLB 110 may store the GTP-C SGW F-TEID in the session table and, optionally, proceed to a block 650. In block 650 based on the MS IP address extracted from the associated create session request and stored in the session table in block 623, load balancer S-vLB 110 determines an IP address for a destination vProbe 121, 122, or 123 to which to send for processing, the session response packet and its associated session request packet stored in RAM in block 613. In a block 652, the load balancer may encapsulate the packets for tunneling and transmit the encapsulated packets to the determined IP-address of the destination vProbe. Load balancer S-vLB 110 may then return to block 602 to receive another GTP-C packet.

If in decision block 420 load balancer S-vLB 110 determines that the GTP-C message is not a create session response, the load balancer may proceed to a decision block 630 to extract a GTP-C F-TEID from the packet. In a block 632 load balancer S-vLB 110 matches the extracted GTP-C TEID with a GTP-C MME F-TEID or GTP-C SGW F-TEID previously stored in the load balancer session table and may proceed to block 650. In block 650 S-vLB 110 calculates an IP address for a destination vProbe 121, 122, or 123 to which to send the packet for processing based on the MS IP address stored in the session table for the GTP-C MME F-TEID or GTP-C SGW F-TEID matched with the GTP-TEID in block 632. In a block 652, S-vLB 110 encapsulates the packet and transmits the packet to the determined IP address of the destination vProbe and may return to block 602 to receive another packet.

In an embodiment Smart-vLB 100 may be configured as described below to load balance user packets in packet flows of EPS sessions between UEs and PDNs connected by LTE 20 and control, "throttle", transmission rates of copies of user packets to a probe for processing to prevent oversubscribing probe capacity. PDNs to which an LTE may connect are identified by PDN-IDs, which are conventionally also referred to as Access Point Names (APNs), and EPS sessions between UEs and PDNs may also be referred to as PDN connections.

To perform the load balancing, Smart-vLB 100 may, as schematically shown in FIG. 6, be configured to receive and process control packets mirrored to Smart-vLB 100 from control plane interfaces, optionally, as discussed above, as well as user packets from user plane interfaces, such as optionally S1-U, S5/S8, and/or SGi interfaces. S1-U and S5/S8 interfaces provide bearers that are concatenated with a data radio bearer (DRB) to provide EPS bearers through which user packets in an EPS session are tunneled from an eNodeB in communication with LTE 20 to which a UE is connected and a PDN to which LTE 20 connects the UE. Interface S1-U governs user packet configuration and transportation through an S1 bearer that provides the EPS bearers with a GTP-U tunnel to transport user packets in the EPS session between the eNodeB to which the UE is connected and a serving gateway SGW of the LTE. Interface S5/S8 governs user packet configuration and transportation through an S5/S8 bearer which provides a GTP-U tunnel to transport user packets in the EPS session between the SGW and a Packet Data Network Gateway (PGW) which connects LTE 20, and thereby the UE, to the PDN. The SGi interface configures communications between the PGW and the PDN.

Figure 8:
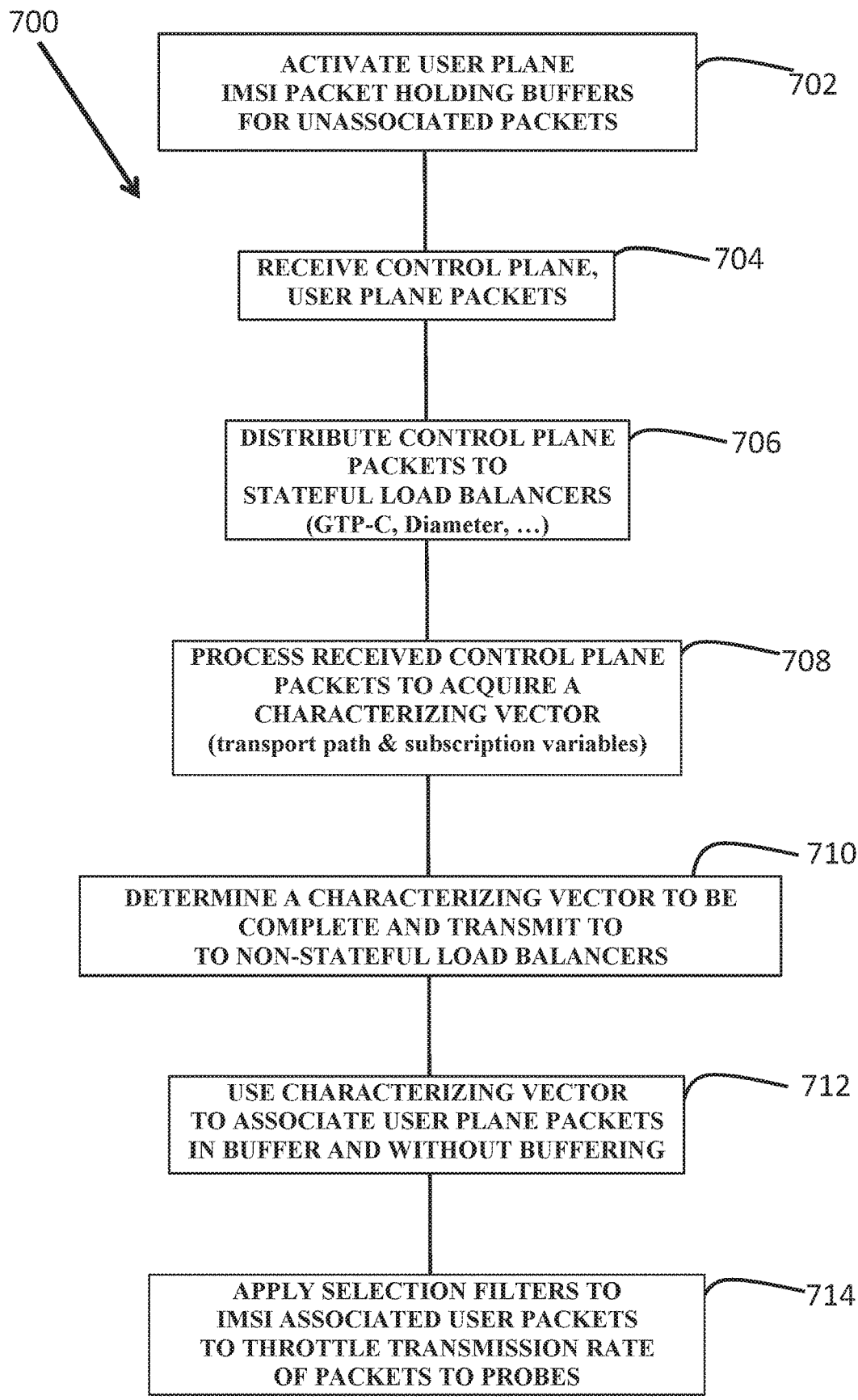
FIG. 8 shows a flow diagram of a procedure by which the Smart-vLB shown in FIG. 6 may operate to load balance and throttle transmission rates of packets transmitted to probes for processing, in accordance with an embodiment of the disclosure.

In accordance with an embodiment, Smart-vLB 100 load balances and throttles copies of user plane packets from UEs connected to LTE 20 based on a particular feature, a target feature, that characterizes the packets. As noted above, the target feature of the packets may by way of example, be an IMSI or an IMEI (International Mobile Equipment Identity) of a UE associated with transmission of the packets, an MSISDN (Mobile Station International Subscriber Directory Number), APN (Access Point Name), QCI, (Quality of Service Class Identifier), and/or a CGI (Cell Global Identifier). For convenience of presentation, it is assumed that the target feature of the packets is their IMSI. FIG. 8 exhibits a flow diagram 700 by which Smart-vLB 100 may associate user packets propagated in EPS sessions through LTE 20 with IMSIs of the UEs participating in the sessions, and based, optionally, on the IMSIs load balance the user packets.

IMSIs of the UEs that the Smart-vLB associates with the user packets. FIG. 8 exhibits a flow diagram 700 by which Smart-vLB 100 may associate user packets propagated in EPS sessions through LTE 20 with IMSIs of the UEs participating in the sessions, and based, optionally, on the IMSIs load balance the user packets.

In a block 702 Smart-vLB 100 may initiate at least one holding buffer for each NS-vLB 101 and 102, in which the NS-vLB temporarily stores user plane packets it receives for which the NS-vLB cannot, or is not as discussed below, fully configured to associate an IMSI.

In a block 704 non-stateful NS-vLBs, by way of example NS-vLBs 101 and 102, comprised in Smart-vLB 100 receive control and user plane packets from interfaces that the Smart-vLB monitors for load balancing. In a block 706 the NS-vLBs forward control plane packets for processing to stateful S-vLBs comprised in Smart-vLB 100, by way of example GTP-C S-vLB 110 and/or Diameter S-vLB 111.

Optionally, in a block 708 the S-vLBs process control plane packets which they receive that are involved in establishing, modifying, tearing down, or configuring an EPS session to acquire, in accordance with an embodiment of the disclosure, an ensemble, hereinafter also referred to as a characterizing vector, of characterizing variables. A characterizing variable of an EPS session is a variable that may be used by itself or in conjunction with another characterizing variable, to associate a user packet transported in the EPS session with an IMSI, which may also be referred to as a session IMSI, of a UE participating in the EPS session. A characterizing variable may also be referred to as a component of a characterizing vector to which the characterizing variable belongs. The characterizing variables may comprise various transport path variables, such as user and NE IDs, and/or user subscription variables. By way of example the characterizing variables may comprise, at least one, or any combination of more than one, of a GUTI and/or IP address assigned by an MME in LTE 20 to the UE for use in the EPS session, the APN of a PDN to which the LTE connects the UE for the session, at least one user plane TEID that identifies a tunnel end of a bearer comprised in the session EPS bearer, and/or an IP address of an NE in LTE 20 that supports the session. Characterizing variables that are associated with an IMSI of a session may be determined by S-vLB 110 and/or S-vLB 110 111 similarly to the manner by which Smart-vLB 100 associates IMSIs with data items in data and/or session records stored in a transaction or session table maintained by Smart-vLB 100 and described with reference to algorithms 300, 400, and/or 500.

In an embodiment, the various S-vLBs that receive and process control plane packets to identify components for a characterizing vector of a session may store the components that the S-vLB identifies in a session record in a session table maintained in a memory of the Smart-vLB. When the session record comprises a number and variety of characterizing variables sufficient to enable substantially any user packet propagated via LTE network 20 in the session to be associated with the session IMSI, the characterizing vector may be considered complete. A characterizing vector for an EPS session that connects a UE with a PDN may be defined to have a predetermined number and type of components, such as by way of example components selected from the components noted above, and when a value is assigned to each component, the characterizing vector may be considered to be complete. Optionally, a characterizing vector is complete when Smart-vLB 100 associates a last TEID that is used in transporting packets via the EPS session with the session IMSI.

In a block 710 Smart-vLB 100 may determine that a characterizing vector for a given EPS session is complete and transmit to each NS-vLB 101, 102 or a selection of NS-vLBs in the Smart-Vlb, the complete characterizing vector for use in associating user packets with the EPS session IMSI and load balancing the associated packets. In an embodiment, S-vLBs in Smart-vLB may be configured to communicate with each other and/or the session table, to determine when a characterizing vector is complete. To provide each of the NS-vLBs with a complete characterizing vector the S-vLBs may operate to assign at least one of the S-vLBs to transmit a complete characterizing vector to at least one of the NS-vLBs. In an embodiment, to provide Smart-vLB 100 with advantageously small latency for processing user packets, an S-vLB that operates to identify characterizing vector components may be configured to transmit the components and/or the vector that it identifies to an NS-vLB using a relatively high-speed communications the high-speed protocol provides transit times for transmission of the components and/or the vector between the S-vLB and NS-vLB that is less than 10 ms. Optionally, the communications protocol provides transit times less than about 5 ms. Optionally, the communications protocol provides transit times less than about 2 ms. In an embodiment the S-vLB high speed protocol is a Zer0MQ protocol.

In the above description, Smart-vLB 100 appears to be configured in accordance with an embodiment to operate a centralized session table for compilation and storage of characterizing vectors and to distribute a characterizing vector to NS-vLBs only after values have been provided for all of the vector components and the vector is considered to be complete. However, practice of an embodiment of the disclosure is not limited to transmitting complete characterizing vectors to NS-vLBs. In an embodiment S-vLBs may be configured, to transmit characterizing components for an EPS session, "piecemeal" substantially as they are identified, to an NS-vLBs in Smart-vLB 100 that is configured to receive the characterizing components piecemeal and compile the components into a characterizing vector. For example, in response to identifying a particular characterizing component of an EPS session, and optionally independent of identifying and/or transmitting another characterizing component, an S-vLB may transmit a copy of the particular component to each NS-vLB together with information sufficient for identifying an IMSI with which the particular component is associated. The NS-vLB may store the particular component it receives together with other components of a characterizing vector associated with the same IMSI with which the particular component is associated in a same record that the NS-vLB maintains and uses to compile a characterizing vector.

Upon receiving and/or compiling a complete characterizing vector, an NS-vLB is fully configured to associate user packets in the given EPS session with the session IMSI and to load balance the packets, and optionally in a block 712, the NS-vLB begins using the characterizing vector to associate user packets in the NS-vLB buffer and user packets as they are received by the NS-vLB, optionally without first storing the packets in the buffer. Using the characterizing vector to associate a user packet with the given IMSI may comprise determining if a header of the user packet contains a data item that matches a component of the characterizing vector. For example, the NS-vLB may associate the user packet with the given IMSI because the user packet header may comprise a TEID which the NS-vLB determines matches a component of the characterizing vector that is a TEID of an EPS bearer associated with the given IMSI. Or the NS-vLB may find that the user packet header may comprise an IP address and APN that matches components of the characterizing vector.

In a block 714 the NS-vLB may apply a selection filter to select from among user packets the NS-vLB has associated with an IMSI, a subset of user packets for load balancing and transmitting to v-Probes 121-123 for processing and to drop from transmitting to the v-Probes user packets that are not selected. In an embodiment, the NS-vLB forwards selected user packets associated with a same IMSI to a same vProbe 121-123 for processing. It is noted that in an embodiment the NS-vLB may operate properly to forward selected user packets associated with a same IMSI to a same vProbe 121-123 for processing, independent of whether the UE associated with the IMSI is assigned an IPv4, IPV6, or Dual Stack MS-IP address, and/or is assigned more than one MS-IP address.

In an embodiment of the disclosure Smart-vLB 100 comprises a library of one or more selection filters that the NS-vLB may be configured to apply to select user packets for load balancing. Optionally, the selection filter library comprises a "depletion filter" that operates to control or throttle a number of packets that Smart-vLB transmits to vProbes 121-123 for processing. In an embodiment, the depletion filter operates to select packets for load balancing and forwarding to vProbes 121-123, to limit a number of packets that Smart-vLB 100 transmits per unit time, also referred to as an LB transmission rate, to a given probe of vProbes 121-123 or globally to all the vProbes for processing. Selection of packets to limit an LB transmission rate may be a function of at least one LB transmission rate upper limit and an LB transmission rate of Smart-vLB 100. For example, if the LB transmission rate of Smart-vLB 100 is less than the at least one LB transmission rate upper limit, the depletion filter may operate so that all user packets that the NS-vLBs associate with an IMSI may be transmitted to a vProbe 121-123. On the other hand, the depletion filter may operate to select only a subset of user packets for transmission to vProbes 121-123 if in the absence of selection, the LB transmission rate would exceed the transmission rate upper limit.

Optionally, the at least one LB transmission rate upper limit is based on a capacity of at least one of vProbes 121-123 to process user packets. In an embodiment, the upper limit is equal to a maximum packet processing rate of vProbes 121-123 or a fraction less than one of the maximum packet processing rate. The fraction less than one may, by way of example be less than or equal to about 0.90. Optionally the fraction less than one is less than or equal to about 0.80. The upper limit may be a function of time of day and/or a geographical region of LTE 20 for which the upper limit is to be applied. In an embodiment the upper limit is a dynamic limit continuously determined in accordance with a proportional-integral-derivative (PID) algorithm to maintain the load balancing rate at a predetermined desired rate.

In an embodiment, the depletion filter is configured to select user packets received by NS-vLBs 121-123 for transmission based on the IMSIs with which the packets are associated so that only packets associated with an IMSI that is a member of a group of selected IMSIs are load balanced and forwarded to vProbes for processing. Optionally member IMSIs are randomly selected.

Optionally, to implement selection of packets based on their respective IMSIs, Smart-vLB 100 may comprise at least one whitelist and at least one blacklist of IMSIs. IMSIs listed in the at least one whitelist may be selected for transmission to vProbes for processing and IMSIs listed in the at least one blacklist may be dropped. In an embodiment the at least one whitelist and/or at least one blacklist may be dynamically updated as a magnitude of packet traffic supported and/or demanded changes. For example, a number of whitelisted IMSIs may be decreased as magnitude of traffic increase and/or new IMSIs may be added or removed to the blacklist and/or whitelist as users connect to and/or disconnect from LTE 20.

In an embodiment a depletion filter, also referred to as a packet flow depletion filter may operate to select user packets for forwarding to vProbes based on the respective packet flows to which the packets belong. Packets belonging to a same packet flow in LTE 20 are identified by a same 5-tuple of information elements that includes a source IP, a destination IP, a source port number, a destination port number, and a communications protocol. A packet flow depletion filter that NS-vLBs in Smart-vLB 100 may apply to packets that Smart-vLB 100 receives from LTE 20 operates to select packets for load balancing from a portion of the packet flows in LTE 20 from which Smart-vLB 100 receives packets. The NS-vLBs forward packets selected by the packet flow depletion filter that belong to a same packet flow to a same vProbe.

In an embodiment the packet flow depletion filter is configured to operate based on a set of operating parameters optionally comprising an activation packet traffic threshold, activation delay, deactivation packet traffic threshold, deactivation delay, and dynamic depletion factor. The packet flow depletion filter is configured to activate to drop packets belonging to a fraction of the packet flows extant in LTE 20 following an activation delay from a time at which packet traffic that Smart-vLB 100 receives from LTE 20 exceeds the activation packet traffic threshold. The fraction of the packet flows from which the NS-vLBs drop packets may be substantially equal to the dynamic depletion factor. The NS-vLBs determine the dynamic depletion factor as a function of magnitude of packet traffic that Smart-vLB 100 receives from LTE 20 so that a transmission rate of packets that Smart-vLB 100 forwards to vProbes 121-123 for processing does not exceed capacity, that is optionally a maximum processing rate, of the vProbes to process the packets. The packet flow depletion filter is configured to deactivate and cease dropping packets following a deactivation delay from a time at which packet traffic that Smart-vLB 100 receives from LTE 20 drops below the deactivation activation packet traffic threshold. Optionally, the activation and deactivation packet traffic thresholds are substantially the same. In an embodiment the activation and deactivation packet traffic thresholds are different. Optionally, the activation and deactivation delays are substantially the same. In an embodiment the activation and deactivation delays are different.

It is noted that Smart-vLB 100 may be configured to apply a packet flow depletion filter to throttle packet transmission to vProbes 121-123 without having recourse to associating packets with an IMSI or a parameter other than an IMSI.

In an embodiment, the filter library comprises a "discrimination filter" that may be applied to select a portion of packets that Smart-vLB 100 receives for load balancing based on features of user subscriber agreements under which users access and transmits packets over LTE 20. A discrimination filter may be operable to select packets for transmission and processing by vProbes 121-123 based on features such as QoS, data services, and/or roaming policies of subscriber agreements associated with IMSIs. By way of example, NS-vLBs 101 and 102 may select packets as a function of QoS associated with an IMSI subscriber policy so that only packets associated with a QoS greater than a threshold QoS are selected for load balancing and forwarding to vProbes 121-123.

In an embodiment Smart-vLB 100 may use more than one selection filter to select packets that the Smart-vLB transmits to a vProbe 121-123. For example, Smart-vLB 100 may use a depletion filter together with a discrimination filter to select and limit a number of packets that Smart-vLB load balances and forwards to vProbes 121-123. The discrimination filter may be used to select the packets based on a QoS threshold determined responsive to a LB transmission rate upper limit determined by a depletion filter. In an embodiment the QoS threshold may rise as a number of user packets that Smart-vLB 100 receives from LTE 20 for load balancing increases.

It is noted that whereas in the above description packets were selected for load balancing and/or throttling based on their association with an IMSI, packets may be selected for load balancing and/or throttling in accordance with an embodiment of the disclosure based on a parameter or parameters other than an IMSI. For example, packets may be selected and/or throttled based on an IMEI, an MSISDN, GUTI, APN, QCI, and/or a CGI with which they may be associated. It is also noted that whereas Smart-vLB 100 is schematically shown and described as load balancing for a 4G LTE communications network a Smart-vLB in accordance with an embodiment may operate to load balance and throttle for 5G architecture and other networks configured to implement control and user plane separation (CUPS). A Smart-vLB in accordance with an embodiment may be advantageous for load balancing CUPS configured communications networks because the Smart-vLB architecture may use entities that operate as stateful load balancers which are different from entities that operate as non-stateful load balancers. For example, the functionalities of NS-vLBs in Smart-vLB 100 may be provided by entities that are different from entities that provide the functionalities of S-vLBs 110-111. As a result, Smart-vLB 100 may provide advantageous processing efficiencies and scaling flexibilities by coupling NS-vLBs 101-102 to receive and process user plane packets in a CUPS configured communications network and S-vLBs 119-111 to receive and process control plane packets from the CUPS network.

It is also noted that whereas Smart-vLB 100 is described as initiating load balancing and/or throttling only after receiving a complete characterizing vector, in an embodiment a Smart-vLB may operate to load balance using characterizing components of a characterizing vector as the Smart-vLB receives them, without waiting to receive all the characterizing components of the characterizing vector.

There is therefore provided in accordance with an embodiment of the disclosure, a load balancing system for a packet switched communications network, the load balancing system comprising: at least one stateful load balancer configured to receive and process copies of control plane packets propagated by the network to determine a characterizing vector for each target feature of at least one target feature that characterizes packets propagated by the network, which vector comprises one or more characterizing components useable to associate packets propagated by the network with the target feature; and at least one non-stateful load balancer configured to: receive the at least one characterizing vector and copies of packets propagated by the network; use the at least one characterizing vector to associate a target feature of the at least one target feature with each of a plurality of the received packets; and load balance and transmit copies of packets that the non-stateful load balancer associates with a target feature of the at least one target feature to at least one probe, and copies of packets associated with a same target feature to a same probe of the at least one probe.

Optionally, the at least one non-stateful load balancer is configured to begin using components of the characterizing vector to associate copies of packets with a given target feature of the at least one target feature only after receiving all the components of the characterizing vector for the given target feature. Optionally the at least one non-stateful load balancer comprises a holding buffer and is configured to store in the buffer packets associated with the given target feature that it receives prior to using the characterizing components.

In an embodiment, the at least one non-stateful load balancer is configured to receive piecemeal the one or more characterizing components for a given target feature of the at least one target feature and to begin using the characterizing components to associate packets with the given target feature substantially at times at which the components are received.

In an embodiment, the at least one stateful load balancer is configured to transmit the one or more components of a characterizing vector to the at least one non-stateful load balancer using a high-speed communications protocol. Optionally, the high-speed protocol provides transit times for transmission of the one or more components from the at least one stateful load balancer to the at least one non-stateful load balancer that is less than about 10 ms (milliseconds), less than about 5 ms, or less than about 2 ms.

In an embodiment, the at least one non-stateful load balancer is configured to process copies of packets propagated in the communications network to determine a characterizing vector for a target feature of the at least one target feature.

In an embodiment, the load balancing system comprises a library having one or more selection filters that the at least one non-stateful load balancer may be configured to apply to select from among packets that the at least one non-stateful load balancer associates with a target feature of the at least one target feature, a subset of packets for load balancing and/or transmitting to the at least one probe for processing. Optionally, the one or more selection filters comprises a depletion filter operable to select a portion of the received packets for load balancing and transmitting to the at least one probe and to drop packets that are not selected to limit a transmission rate to the at least one probe. Optionally, the depletion filter is configured to select a packet for load balancing and transmitting based on a function of at least one transmission rate upper limit and a transmission rate of the at least one non-stateful load balancer. The at least one transmission rate upper limit may be based on a capacity of the at least one probe to process packets that the at least one probe receives from the at least one non-stateful load balancer. The at least one transmission rate upper limit may be a fraction less than one of a maximum packet processing rate of the at least one probe.

In an embodiment, the at least one transmission rate upper limit is a dynamic limit configured to repeatedly be updated. Optionally the upper limit is updated in accordance with a proportional-integral-derivative (PID) algorithm.

In an embodiment, the depletion filter operates to drop packets if in the absence of dropping packets, the transmission rate would exceed the at least one transmission rate upper limit.

In an embodiment, the one or more selection filters comprises a depletion filter that has an activation packet traffic threshold and activation delay and is configured to activate to drop packets at a given time if packet traffic in the communications network is in excess of the activation packet traffic threshold for a period of time ending at the given time that is greater than the activation delay. Optionally, the depletion filter having the activation packet traffic threshold comprises a deactivation packet traffic threshold and deactivation delay and is configured to deactivate and cease dropping packets at a given time after activation if packet traffic that the at least one non-stateful load balancer receives is less than the deactivation packet traffic threshold for a period of time ending at the given time that is greater than the deactivation delay.

In an embodiment, the one or more selection filters comprises a discrimination filter that operates to select received packets for load balancing and/or transmitting to the at least one probe based on features of user subscriber agreements under which users access and transmits packets over the communications network.

In an embodiment, the at least one target feature comprises at least one and any combination of more than one of an IMSI (International Mobile Subscriber Identity), an IMEI (International Mobile Equipment Identity), an MSISDN (Mobile Station International Subscriber Directory Number), APN (Access Point Name), QCI, (Quality of Service Class Identifier), a CGI (Cell Global Identifier), and/or a flow in the communications network to which a packet belongs.

In an embodiment, copies of packets that the non-stateful load balancers receive are copies of user plane packets.

In an embodiment, copies of packets that the non-stateful load balancers receive are copies of control plane packets.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A load balancing system for a packet switched communications network, the load balancing system comprising:
   a plurality of probes for processing data from the network;
   at least one stateful load balancer configured to receive control plane packets mirrored from interfaces in the network and process the received packets determine for each target feature of a plurality of target features that characterize packets propagated by the network, a characterizing vector having one or more components associated with the target feature; and
   at least one non-stateful load balancer configured to:
      receive the determined characterizing vector for each target feature from the at least one stateful load balancer;
      receive packets mirrored from interfaces in the network;
      associate each of a plurality of the packets mirrored to the at least one non-stateful load balancer with a target feature of the plurality of target features using the received characterizing vector determined for the target feature; and
      load balance and transmit packets that the non-stateful load balancer associates with the same target feature to a same at least one probe of the plurality of probes for processing.

2. The load balancing system according to claim 1 wherein the at least one non-stateful load balancer is configured to begin using the characterizing vector for a given target feature of the plurality of target features only after receiving all the components of the characterizing vector.

3. The load balancing system according to claim 2 wherein the at least one non-stateful load balancer comprises a holding buffer and is configured to store in the buffer packets associated with the given target feature that it receives prior to using the characterizing vector.

4. The load balancing system according to claim 1 wherein the at least one non-stateful load balancer is configured to receive piecemeal the one or more components of the characterizing vector for a given target feature of the plurality of target features and to begin using the characterizing vector to associate packets with the given target feature substantially at times at which the components are received.

5. The load balancing system according to claim 1 wherein the at least one stateful load balancer is configured to transmit the one or more components of the characterizing vector for a given target feature of the plurality of target features to the at least one non-stateful load balancer using a high-speed communications protocol.

6. The load balancing system according to claim 5 wherein the high-speed protocol provides transit times for transmission of the one or more components from the at least one stateful load balancer to the at least one non-stateful load balancer that is less than about 10 ms (milliseconds), less than about 5 ms, or less than about 2 ms.

7. The load balancing system according to claim 1 wherein the at least one non-stateful load balancer is configured to process received packets mirrored from an interface in the communications network to determine the characterizing vector for a target feature of the at least one target feature.

8. The load balancing system according to claim 1 and comprising a library having one or more selection filters that the at least one non-stateful load balancer may apply to select from among packets that the at least one non-stateful load balancer associates with a target feature of the plurality of target features, a subset of packets for load balancing and/or transmitting to the at least one probe for processing.

9. The load balancing system according to claim 8 wherein the one or more selection filters comprises a depletion filter operable to select a portion of the packets mirrored to the load balancing system for load balancing and transmitting to the at least one probe, and to drop packets that are not selected to limit a transmission rate to the at least one probe.

10. The load balancing system according to claim 9 wherein the depletion filter is configured to select a packet for load balancing and transmitting based on a function of at least one transmission rate upper limit and/or a transmission rate of the at least one non-stateful load balancer.

11. The load balancing system according to claim 10 wherein the at least one transmission rate upper limit is based on a capacity of the at least one probe to process packets that the at least one probe receives from the at least one non-stateful load balancer.

12. The load balancing system according to claim 11 wherein the at least one transmission rate upper limit is a fraction less than one of a maximum packet processing rate of the at least one probe.

13. The load balancing system according to claim 10 wherein the at least one transmission rate upper limit is a dynamic limit configured to repeatedly be updated.

14. The load balancing system according to claim 13 wherein the upper limit is updated in accordance with a proportional-integral-derivative (PID) algorithm.

15. The load balancing system according to claim 10 wherein the depletion filter operates to drop packets if in the absence of dropping packets, the transmission rate would exceed the at least one transmission rate upper limit.

16. The load balancing system according to claim 8 wherein the one or more selection filters comprises a depletion filter that has an activation packet traffic threshold and activation delay and is configured to activate to drop packets at a given time if packet traffic in the communications network is in excess of the activation packet traffic threshold for a period of time ending at the given time that is greater than the activation delay.

17. The load balancing system according to claim 16 wherein the depletion filter having the activation packet traffic threshold comprises a deactivation packet traffic threshold and deactivation delay and is configured to deactivate and cease dropping packets at a given time after activation if packet traffic that the at least one non-stateful load balancer receives is less than the deactivation packet traffic threshold for a period of time ending at the given time that is greater than the deactivation delay.

18. The load balancing system according to claim 8 wherein the one or more selection filters comprises a discrimination filter that operates to select received packets for load balancing and/or transmitting to the at least one probe based on features of user subscriber agreements under which users access and transmits packets over the communications network.

19. The load balancing system according to claim 1 wherein the plurality of target feature comprises at least one or any combination of more than one of an IMSI (International Mobile Subscriber Identity), an IMEI (International Mobile Equipment Identity), an MSISDN (Mobile Station International Subscriber Directory Number), APN (Access Point Name), QCI, (Quality of Service Class Identifier), a CGI (Cell Global Identifier), and/or a flow in the communications network to which a packet belongs.

20. The load balancing system according to claim 1 wherein the mirrored packets that the non-stateful load balancers receive comprise user plane packets.

21. The load balancing system according to claim 1 wherein the mirrored packets that the non-stateful load balancers receive comprise control plane packets.

\* \* \* \* \*